(12) United States Patent
Dunn

(10) Patent No.: US 11,096,243 B2
(45) Date of Patent: Aug. 17, 2021

(54) PROGRAMMABLE MULTI-WAVEFORM RF GENERATOR FOR USE AS BATTLEFIELD DECOY

(71) Applicant: Jeffrey Dunn, Alexandria, VA (US)

(72) Inventor: Jeffrey M. Dunn, Stafford, VA (US)

(73) Assignee: KWESST INC., Kanata (CA)

( * ) Notice: Subject to any disclaimer, the term of this patent is extended or adjusted under 35 U.S.C. 154(b) by 298 days.

(21) Appl. No.: 16/116,914

(22) Filed: Aug. 30, 2018

(65) Prior Publication Data

US 2020/0366402 A1 Nov. 19, 2020

Related U.S. Application Data

(60) Provisional application No. 62/657,706, filed on Apr. 13, 2018.

(51) Int. Cl.
| | | |
|---|---|---|
| *H04W 84/00* | (2009.01) | |
| *G01S 19/18* | (2010.01) | |
| *H04W 12/08* | (2009.01) | |
| *H04L 29/06* | (2006.01) | |
| *H04W 84/18* | (2009.01) | |
| *H04K 3/00* | (2006.01) | |
| *G01S 7/38* | (2006.01) | |
| *G01S 7/537* | (2006.01) | |
| *H04K 1/02* | (2006.01) | |

(52) U.S. Cl.
CPC ............. *H04W 84/00* (2013.01); *G01S 7/38* (2013.01); *G01S 7/537* (2013.01); *G01S 19/18* (2013.01); *H04K 3/65* (2013.01); *H04K 1/02* (2013.01); *H04K 3/28* (2013.01); *H04L 63/0442* (2013.01); *H04W 12/08* (2013.01); *H04W 84/18* (2013.01)

(58) Field of Classification Search
CPC ............ H04K 1/02; H04K 1/003; H04K 1/10; H04K 3/825; H04K 3/00; H04K 3/25; H04K 3/28; H04K 1/006; H04K 3/226; H04K 3/42; H04K 3/65; H04K 2203/24; H04K 3/41; H04B 10/85; H04B 1/0003; H04L 63/0428; H04L 2209/08; H04L 63/1416; H04L 63/1491; H04L 2209/80; H04L 63/0442; H04L 63/068; H04L 2463/062; H04Q 11/0003; G01S 7/38; G01S 19/18; G01S 19/215; G01S 7/537; G01S 13/003; G01S 7/36; G01S 7/495; G01S 19/14; G01S 7/021; F41H 3/00; F41H 11/02; F41H 11/00; F41G 7/224; H01Q 1/28; H04W 12/06; H04W 84/00; H04W 12/001; H04W 84/18; H04W 12/03; H04W 12/08; G06K 9/00503; F41J 2/00; F42B 12/70

See application file for complete search history.

(56) References Cited

U.S. PATENT DOCUMENTS 4,705,477 A * 11/1987 Komorowski ............ F41G 3/26
434/15
4,990,919 A * 2/1991 Manoogian ............... G01S 7/38
342/13

(Continued)

*Primary Examiner* — Olumide Ajibade Akonai
(74) *Attorney, Agent, or Firm* — Juneau & Mitchell; Todd L. Juneau

(57) ABSTRACT

The invention relates to a portable electronic signal generator, and in particular a programmable multi-waveform radiofrequency generator for use as battlefield decoy.

11 Claims, 17 Drawing Sheets

(56) References Cited

U.S. PATENT DOCUMENTS

| | | | |
|---|---|---|---|
| 5,086,467 A * | 2/1992 | Malek | H04K 3/825 327/100 |
| 5,094,168 A * | 3/1992 | Rumer | F41H 9/06 102/334 |
| 6,198,404 B1 * | 3/2001 | Campagnuolo | F41A 33/04 340/384.3 |
| 6,414,622 B1 * | 7/2002 | Rougas | F41G 7/224 342/13 |
| 6,535,855 B1 | 3/2003 | Cahill | |
| 6,705,573 B2 | 3/2004 | McDonnell | |
| 6,796,213 B1 | 9/2004 | McKendree | |
| 6,825,791 B2 | 11/2004 | Sanders | |
| 6,825,792 B1 | 11/2004 | Letovsky | |
| 6,921,336 B1 | 7/2005 | Best | |
| 6,952,001 B2 | 10/2005 | McKendree | |
| 6,980,151 B1 | 12/2005 | Mohan | |
| 7,205,520 B1 | 4/2007 | Busse | |
| 7,207,517 B2 | 4/2007 | McKendree | |
| 7,207,566 B2 | 4/2007 | Hodge | |
| 7,214,065 B2 | 5/2007 | Fitzsimmons | |
| 7,230,221 B2 | 6/2007 | Busse | |
| 7,333,050 B2 | 2/2008 | Svy | |
| 7,350,744 B1 | 4/2008 | Schwartz | |
| 7,520,356 B2 | 4/2009 | Sadegh | |
| 7,610,841 B2 | 11/2009 | Padan | |
| 7,848,517 B2 * | 12/2010 | Britz | H04L 63/0428 380/33 |
| 7,930,761 B2 | 4/2011 | Smith | |
| 7,994,967 B2 | 8/2011 | Mountcastle | |
| 8,005,636 B2 | 8/2011 | Shipton | |
| 8,049,656 B2 | 11/2011 | Shani | |
| 8,069,489 B2 | 11/2011 | Mithal | |
| 8,130,141 B2 * | 3/2012 | Pattabiraman | G01S 19/11 342/357.29 |
| 8,187,866 B2 | 5/2012 | Duer | |
| 8,201,773 B1 | 6/2012 | Durham | |
| 8,288,157 B2 | 10/2012 | Duer | |
| 8,296,664 B2 | 10/2012 | Dixon | |
| 8,646,719 B2 | 2/2014 | Morris | |
| 8,757,486 B2 | 6/2014 | Cook | |
| 8,769,687 B2 | 7/2014 | Hoefelmeyer | |
| 8,903,304 B2 | 12/2014 | Coleman | |
| 9,170,074 B2 | 10/2015 | Beckman | |
| 9,177,139 B2 | 11/2015 | Roskos | |
| 9,199,736 B2 | 12/2015 | Eliahou-Niv | |
| 9,662,565 B1 | 5/2017 | Riordan | |
| 9,743,461 B1 | 8/2017 | Loughran | |
| 9,779,191 B1 | 10/2017 | Hershey | |
| 9,846,006 B2 | 12/2017 | Beckman | |
| 9,853,999 B2 | 12/2017 | Singh | |
| 9,891,024 B2 | 2/2018 | Sjölund | |
| 9,985,988 B2 | 5/2018 | Gukal | |
| 10,295,989 B1 | 5/2019 | Nevins | |
| 10,326,796 B1 | 6/2019 | Varadarajan | |
| 10,362,057 B1 | 7/2019 | Wu | |
| 10,498,763 B2 | 12/2019 | Araujo | |
| 10,551,147 B1 | 2/2020 | Follansbee | |
| 10,616,276 B2 | 4/2020 | Wu | |
| 10,628,440 B1 | 4/2020 | Rubin | |
| 2001/0056546 A1 | 12/2001 | Ogilvie | |
| 2004/0069898 A1 * | 4/2004 | Peckham | F41F 3/06 244/10 |
| 2004/0174570 A1 | 9/2004 | Plunkett | |
| 2004/0219491 A1 | 11/2004 | Shlomo | |
| 2005/0166072 A1 | 7/2005 | Converse | |
| 2006/0050929 A1 | 3/2006 | Rast | |
| 2006/0178758 A1 | 8/2006 | Koriat | |
| 2007/0007384 A1 | 1/2007 | Sliwa | |
| 2007/0225993 A1 | 9/2007 | Moore | |
| 2008/0045343 A1 | 2/2008 | Sauberman | |
| 2008/0198060 A1 * | 8/2008 | Shani | H01Q 1/28 342/14 |
| 2008/0235795 A1 | 9/2008 | Ishikawa | |
| 2008/0287856 A1 | 11/2008 | MacDonald | |
| 2008/0296842 A1 | 12/2008 | Novak | |
| 2009/0058715 A1 | 3/2009 | Sarafian | |
| 2009/0128394 A1 | 5/2009 | Shin | |
| 2012/0049009 A1 | 3/2012 | Kissel | |
| 2012/0070002 A1 | 3/2012 | Smith | |
| 2012/0295615 A1 * | 11/2012 | Nelkenbaum | H04W 4/029 455/427 |
| 2014/0183300 A1 | 7/2014 | MacCulloch | |
| 2014/0245916 A1 | 9/2014 | Adler | |
| 2015/0025842 A1 | 1/2015 | Hodge | |
| 2016/0041252 A1 | 2/2016 | Cintron-Aponte | |
| 2016/0134644 A1 | 5/2016 | Chan | |
| 2016/0146580 A1 * | 5/2016 | Tithecott | F41H 11/02 342/14 |
| 2016/0269435 A1 | 9/2016 | Hershey | |
| 2016/0330601 A1 | 11/2016 | Srivastava | |
| 2016/0344769 A1 | 11/2016 | Li | |
| 2016/0363322 A1 * | 12/2016 | Khmeloev | F41H 11/02 |
| 2016/0379479 A1 | 12/2016 | Nepo | |
| 2017/0067829 A1 | 3/2017 | Duer | |
| 2017/0082617 A1 | 3/2017 | Duer | |
| 2017/0093910 A1 | 3/2017 | Gukal | |
| 2017/0103632 A1 | 4/2017 | Tolle | |
| 2017/0141854 A1 | 5/2017 | Britz | |
| 2017/0214486 A1 * | 7/2017 | Choi | H04K 3/65 |
| 2017/0214708 A1 | 7/2017 | Gukal | |
| 2017/0223046 A1 | 8/2017 | Singh | |
| 2017/0250796 A1 | 8/2017 | Samid | |
| 2017/0289191 A1 | 10/2017 | Thioux | |
| 2017/0302691 A1 | 10/2017 | Singh | |
| 2017/0310704 A1 | 10/2017 | Wu | |
| 2017/0363707 A1 | 12/2017 | Mateti | |
| 2018/0031476 A1 | 2/2018 | Duer | |
| 2018/0052130 A1 | 2/2018 | Farhat | |
| 2018/0099731 A1 | 4/2018 | Beckman | |
| 2018/0180564 A1 | 6/2018 | Farhart | |
| 2018/0224543 A1 | 8/2018 | Lanham | |
| 2018/0265937 A1 | 9/2018 | Duer | |
| 2019/0077503 A1 | 3/2019 | Reddy | |
| 2019/0199748 A1 | 6/2019 | Gopalakrishna | |
| 2019/0310252 A1 | 10/2019 | Banerjee | |
| 2019/0373012 A1 | 12/2019 | Mattson | |
| 2020/0097668 A1 | 3/2020 | Hofleitner | |

* cited by examiner

Fig. 7
Top View
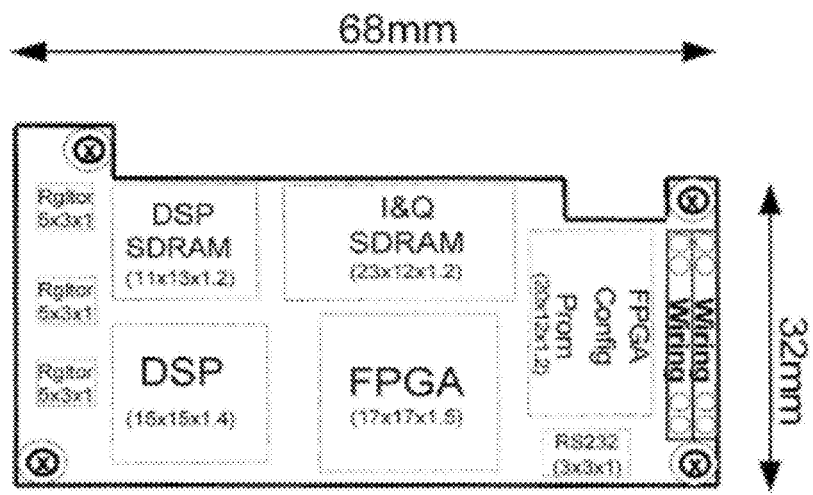
Bottom View
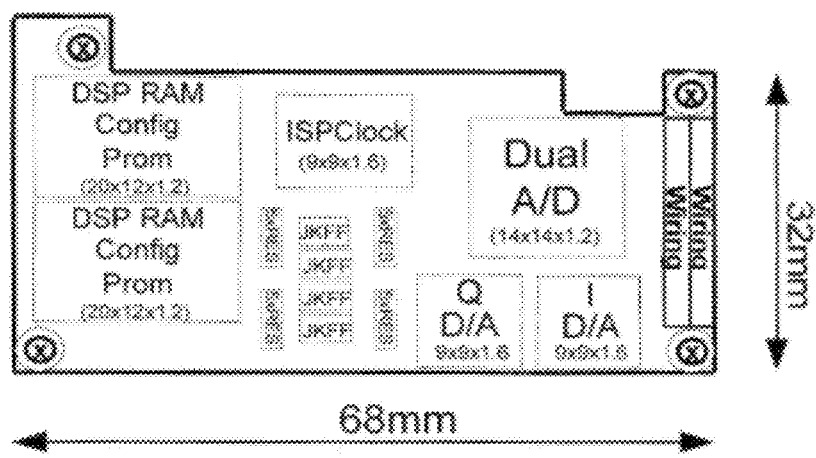

The Frequency and Demonstrated Throughput of JTRS, Legacy Waveforms, and Cellular Networks

PROGRAMMABLE MULTI-WAVEFORM RF GENERATOR FOR USE AS BATTLEFIELD DECOY

CROSS-REFERENCE TO RELATED APPLICATIONS

Provided per USPTO rules by Application Data Sheet.

STATEMENT REGARDING FEDERALLY SPONSORED R&D

Provided per USPTO rules by Application Data Sheet.

NAMES OF PARTIES TO JOINT RESEARCH AGREEMENT

Provided per USPTO rules by Application Data Sheet.

REFERENCE TO SEQUENCE LISTING

Provided per USPTO rules by Application Data Sheet.

STATEMENT RE PRIOR DISCLOSURES

Provided per USPTO rules by Application Data Sheet.

BACKGROUND OF THE INVENTION

Field of the Invention

The invention relates to a portable electronic signal generator, and in particular a programmable multi-waveform radiofrequency generator.

Description of the Related Art

Modern military formations use a variety of electronic devices, and, as a result, modern military formations emit a variety of electromagnetic signals.

It is well-known that military assets can be tracked and/or targeted by capturing the electromagnetic signals of such assets or formations, and triangulating, using two or more receivers, the location where the target signals are being generated.

Electronic equipment uses different signal frequencies, signal amplitudes, and signal power depending on the equipment being used. The specific characteristics are known as the electronic signature of a device. Hand-held communication equipment, radar equipment, motors, engines, and so forth each has their own electronic signature.

Furthermore, a collection of electronic equipment, can also have its own collective signature. Modern militaries are aware of the exact type of electronic equipment used by their allies and adversaries, including the signal characteristics, the quantity of certain types of signals, the timing and use of certain types of signals, and so forth. Accordingly, it is possible to detect the exact type of military formation, their size, their equipment, their location, and their movement by receiving and analyzing the electromagnetic signature of such a formation. Electronic warfare specialists can tell if a military unit is an artillery unit, a mechanized unit, or a ground troop formation.

Past airborne decoy systems involved the dispersal of physical chaff. More recently, sophisticated RF targeting by missiles and artillery demanded the next first generation of expendable electronic active decoys. However, these expendable active decoys were limited to generating a signal for a single aircraft. The first operational EAD was the Primed Oscillator Expendable Transponder (POET) developed by the US and first produced in 1978. This device evolved to become the Generic Expendable Decoy (GEN-X) which was developed in the mid to late 1980's. Due to the technology available at the time these devices had limited capability.

During the late 1980s the Towed Radar Decoy (TRD) was developed. These provide higher jammer powers and have much greater capability because the jamming waveform is generated by a large and complex Digital RFMemory (DRFM) based jammer on-board the aircraft. The jamming signal is then fed to the decoy via an optical fibre in the tow cable. This has been the preferred active off board ECM solution for the last 20 years. More recently a system disclosed in U.S. Pat. No. 8,049,656 B2 has been proposed.

This decoy is disclosed as an expendable, stand-alone, off-board Electronic Counter-Measure system, airborne RF decoy aimed to provide airborne platforms with protection against multiple radar-based threats including Air-to-Air and Surface-to-Air missiles both active and semi-active ones by providing the mechanical outline of standard chaff and flare decoys, is ejected from any platform by pyrotechnic elements, and deceives enemy radar-based threats by acquiring illuminating radar signals and then altering the received signals to generate an authentic false target and transmitting a deceiving signal towards the radar threat. However, these expendable active decoys are limited to generating a signal for a single aircraft.

Accordingly, there is a need to be able to electronically protect large formations from being electronically identified, targeted, and attacked.

BRIEF SUMMARY OF THE INVENTION

In order to address these and other problems in this art, the invention described and claimed herein provides a device that can be used to establish battlefield decoys that electronically emit the same or similar electronic signature as a military asset or military formation.

Accordingly, the invention provides in on non-limiting preferred embodiment a battlefield decoy, comprising: (1) an RF housing with a radio-opaque chassis disposed within the RF housing; (2) a System on a Chip (SOC) mounted within the radio-opaque chassis, said SOC having FPGA programmable logic, an application processing unit, a real-time processing unit, a platform management unit, a cybersecurity unit, a memory controller connected to local DDR memory, and a peripheral controller connected to peripheral components; (3) software programming code for simultaneously transmitting a set of at least four (4) battlefield waveforms, said battlefield waveforms contained in the SOC, said code including a library of saved battlefield waveforms selected from the group consisting of (3.1) modern software defined radio (SDR) waveform, (3.2) CDL (Common Data Link), (3.3) TCDL (Tactical CDL), (3.4) Bandwidth-Efficient CDL, (3.5) Digital Data Link (DDL), (3.6) Harris Adaptive Networking Wideband (ANW2) Waveform, (3.7) Harris AN/PRC-117G radio 30 MHz-2 GHz waveform (ANW2), (3.8) Harris AN/PRC-152A waveform, (3.9) DDL, (3.10) MAGTF CLT, (3.11) USA BCT, (3.12) Soldier Radio Waveform (SRW), (3.13) SRW narrowband by Harris and TrellisWare, (3.14) Wideband Networking Waveform (WNW), (3.15) MUOS satellite waveform, (3.16) Single Channel Ground and Airborne Radio System (SINCGARS) at 30-87.975 MHz e.g. at 111 hops per second, (3.17) the HAVE QUICK-I/II waveform having 225 MHz to 400 MHz waveband, (3.18) UHF 300 MHz-3 GHz, (3.19) VHF 30 MHZ-300 MHz, (3.20) broadband Mobile Ad Hoc Networking (MANET) waveform, (3.21) Wide Band Networking Radio Waveform (WBNR), (3.22) European Secure Software Radio (ESSOR), and (3.23) Coalition Wideband Networking Waveform (COALWNW); (4) a re-programming module for changing from a first battlefield waveform signature set to a second battlefield waveform signature set contained in the SOC; (5) an RF module contained in the SOC for controlling RF components in the RF housing; (6) a spectrum manager module contained in the SOC for communicating with a spectrum manager in the network to allocate and coordinate non-interfering battlefield communication channels; (7) a GPS-denied network clocking synchronizer module contained in the SOC for maintaining network clock synchronization in a GPS-denied environment; (8) a transmission scheduler module contained in the SOC for setting a schedule of transmission start times and transmission durations; (9) an RF system mounted within the RF housing, said RF system having components selected from at least one antenna operationally connected to a duplexer, a power amplifier, a band pass filter, a mixer, a local oscillator, an intermediate frequency filter, a modulator, a baseband processor, a demodulator, a second intermediate frequency filter, a second mixer, a second local oscillator, a low noise amplifier, and a second band pass filter; (10) a network interface controller connected to the SOC; (11) a GPS receiver with integrated GPS antenna, connected to the SOC; and (12) a power supply.

In another preferred embodiment, the invention provides a programmable battlefield decoy that further comprises a second System on a Chip that is configured in parallel to the (first) System on a Chip but is positioned away from the first System on a Chip and at a different orientation to provide RF hardening redundancy.

In another preferred embodiment, the invention provides a programmable battlefield decoy wherein the RF components are implemented in a Software Defined Radio (SDR) as a software module on a personal computer or as an embedded System on a Chip.

In another preferred embodiment, the invention provides a programmable battlefield decoy wherein the re-programming module for changing from a first waveform signature to a second waveform signature is operatively connected to a waveform update module that is configurable by receiving updated waveforms by direct hardware link through a update port in the housing, or by a wireless link through a wireless transceiver.

In another preferred embodiment, the invention provides a programmable battlefield decoy that has a small form factor housing that is no larger in dimension than 14"×6"×6".

In another preferred embodiment, the battlefield decoy comprises a repeater module having programming code to receive and re-transmit a specific waveform or signal pattern as a bent-pipe repeater without additional digital signal processing.

In another preferred embodiment, the battlefield decoy comprises a repeater module having programming code to receive, process, and re-transmit a specific waveform or signal pattern, wherein said processing comprises demodulation-remodulation using a MODEM, decompression-recompression using a CODEC, decryption-re-encryption, noise reduction using a filter or software to reduce or eliminate noise, and amplification.

In another preferred embodiment, the battlefield decoy comprises wherein the non-antenna RF components including duplexer, power amplifier, band pass filter, mixer, local oscillator, intermediate frequency filter, modulator, baseband processor, demodulator, second intermediate frequency filter, second mixer, second local oscillator, low noise amplifier, and second band pass filter, are implemented in the System on Chip (SOC).

In another preferred embodiment, the battlefield decoy comprises an SoC that is a Xilinx Zynq-7000 or 7000S device having a single-core ARM Cortex™-A9 processor mated with 28 nm Artix®-7 or Kintex®-7 based programmable logic, at least one 6.25 Gb/s to 12.5 Gb/s transceiver, and hardened peripherals.

In another preferred embodiment, the battlefield decoy comprises an SoC that is an MPSoC having an Application Processing Unit Quad Arm A53 in communication with an FPGA programmable logic chip, the FPGA programmable logic chip is in communication with a Real Time Processing Unit Dual Arm R5, a Platform Management Unit and a Cyber Security Unit/Module, the FPGA programmable logic chip is also in communication with peripheral controllers for peripherals, and with memory controllers for multiple DDR modules.

In another preferred embodiment, the battlefield decoy comprises an SoC that is configured as a High Intermediate Frequency (IF) Heterodyne Receiver connected to a Direct RF Sampling receiver having an all programmable RFSoC with a DDC connected to a RFADC, wherein a Local Oscillator (LO) feeds a signal into an RF A-D converter which is in communication with a bandwidth Phase Filter (BPF) and an Anti-Aliasing Filter (AAF), the BPF and AAF feed into a low noise amplifier (LNA) which is connected to an antenna assembly.

In another preferred embodiment, the invention comprises a Method for deploying a battlefield decoy comprising the step: (i) selecting the type of military formation that a user wishes to emulate from a menu having a selection of battlefield waveform signature sets, at least one of said battlefield waveform signature sets comprising at least four (4) battlefield waveforms; (ii) selecting a battlefield waveform signature set; (iii) pre-selecting an alternate battlefield waveform signature set for fast re-programming; (iv) selecting the duration and periodicity of signal transmission of the battlefield waveform signature set; (v) selecting the type of desired signal characteristics such as the control channel used for encryption and the type of encryption such as AES/DES; and (vi) deploying the activated decoy to the field and running any networking and collaboration routines/programming to establish the desired global or system-wide arrangement of decoys.

In another preferred embodiment, the method is performed using the battlefield decoy of claimed herein.

In another preferred embodiment, the method further comprises the step of performing a spectrum interference scan by executing software code in a spectrum manager module contained in the SOC for communicating with a spectrum manager in the network to allocate and coordinate non-interfering battlefield communication channels.

In another preferred embodiment, the method further comprises the step of performing a GPS availability scan by executing software code in a GPS-denied network clocking synchronizer module contained in the SOC for maintaining network clock synchronization in a GPS-denied environment.

BRIEF DESCRIPTION OF THE SEVERAL VIEWS OF DRAWING

FIG. 7 is non-limiting example of a depicts a top view and a bottom view layout of the digital board inside an RF decoy of the invention.

Figure 14:
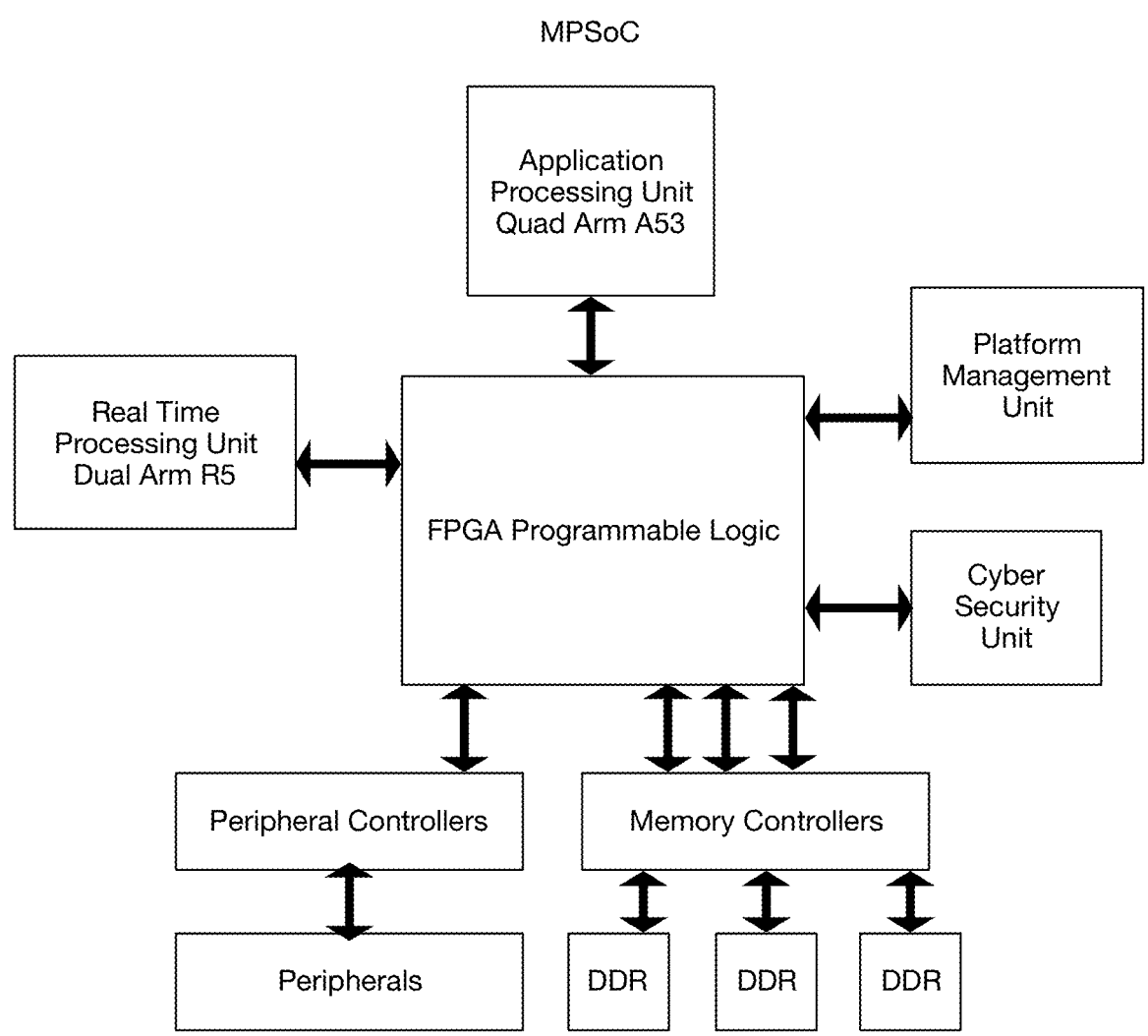

FIG. 14 is an illustration of a block diagram in accordance with the present invention. FIG. 14 shows an MPSoC having an Application Processing Unit Quad Arm A53 in communication with an FPGA programmable logic chip. The FPGA programmable logic chip is in communication with a Real Time Processing Unit Dual Arm R5, and a Platform Management Unit and a Cyber Security Unit/Module. The FPGA programmable logic is also in communication with peripheral controllers for peripherals, and with memory controllers for multiple DDR modules.

Figure 15:
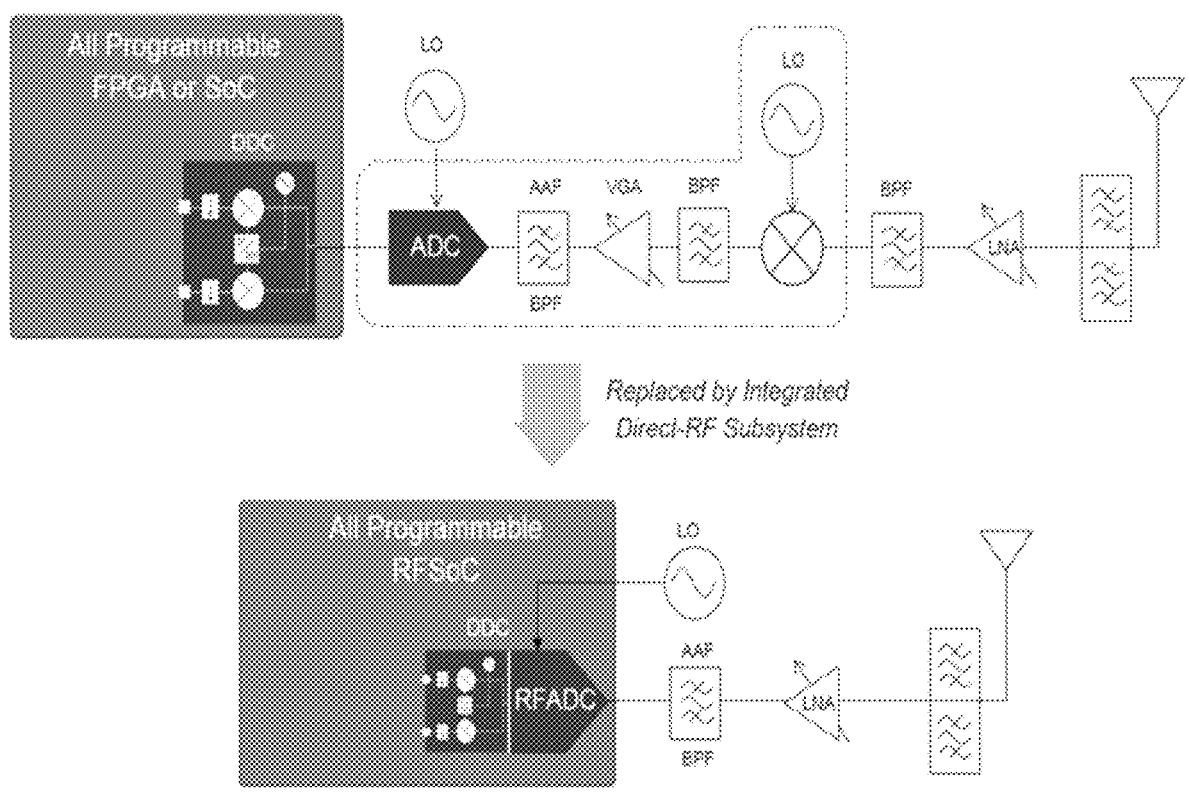

FIG. 15 is an illustration of a circuit diagram in accordance with the present invention. FIG. 15 shows a High Intermediate Frequency (IF) Heterodyne Receiver connected to a Direct RF Sampling receiver having an all programmable RFSoC with a DDC connected to a RFADC. The Local Oscillator (LO) feeds a signal into the RF A-D converter which is in communication with a bandwidth Phase Filter (BPF) and an Anti-Aliasing Filter (AAF). The BPF and AAF feed into the low noise amplifier (LNA) which is connected to the antenna assembly.

Figure 16:
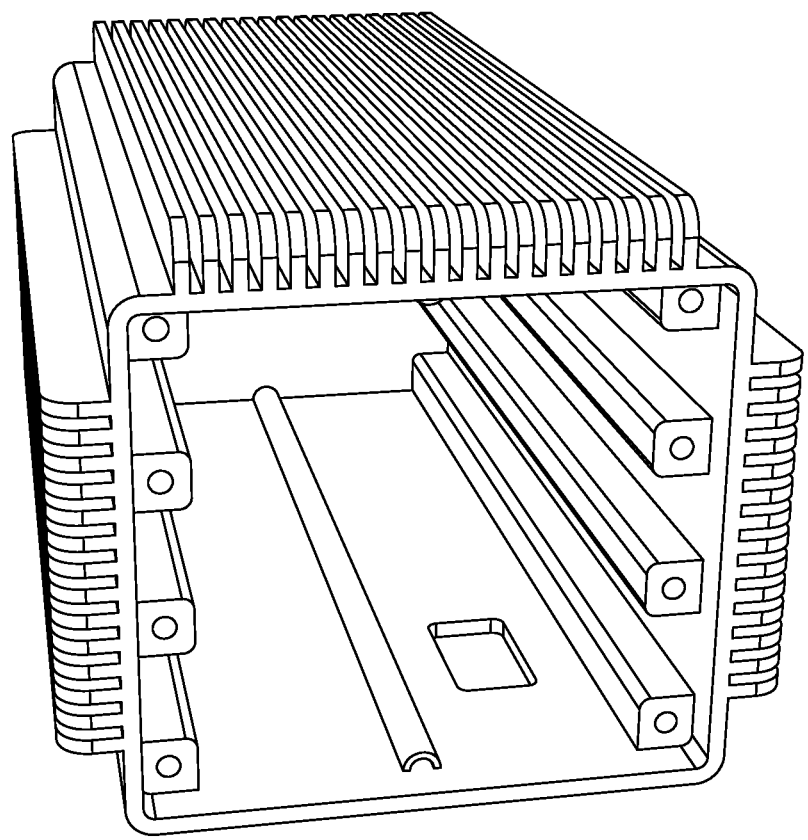

FIG. 16 is an illustration of a electronics chassis used in the decoy of the present invention.

Figure 17:
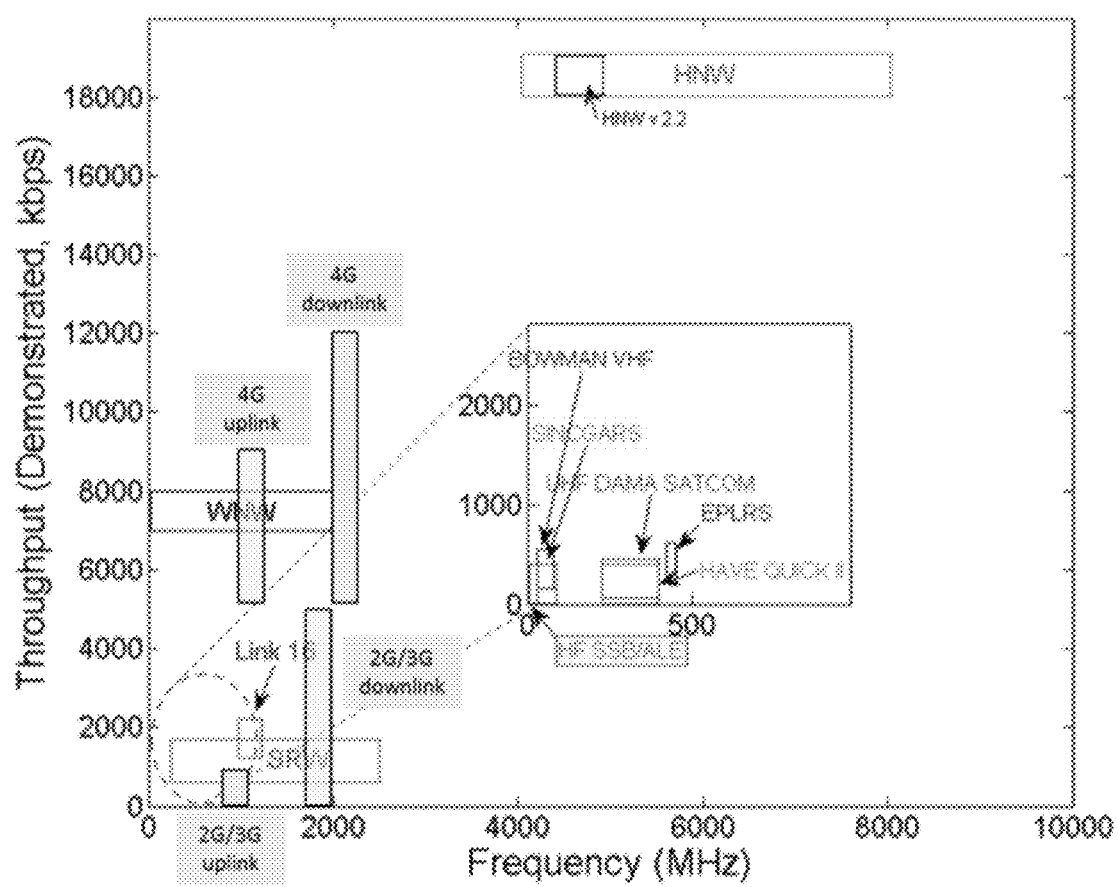

FIG. 17 is a graph showing operating frequencies of commercial cellular transmissions compared to battlefield waveforms.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

DEFINITIONS

The phrase "radiofrequency or RF components" refers to antenna(s), duplexer, power amplifier, bandpass filter, 1st mixer, 1st Local Oscillator, intermediate frequency filter, modem, baseband processor, 2d IF filter, 2d mixer, 2d LO, Low Noise Amplifier, 2d BP filter, and optionally may include one or more accelerometers, codec, GPS unit, and repeaters.

The phrase "System on Chip", or SoC, refers to an integrated circuit chip that integrates all or most of the components of a computer or electronic system. SoC usually includes (i) one or more microcontroller, microprocessor or digital signal processor (DSP) core(s), (ii) memory blocks including a selection of ROM, RAM, EEPROM and flash memory, (iii) timing sources/clock signal generators, including oscillators and phase-locked loops to control execution of SoC functions, (iv) peripherals including counter-timers, real-time timers and power-on reset generators, (v) external interfaces and programming for communication protocols including WiFi, Bluetooth, cellular, USB, FireWire, Ethernet, USART, SPI, and HDMI, (vi) analog interfaces including analog-to-digital converters and digital-to-analog converters, (vii) voltage regulators and power management circuits, and/or (viii) a computer bus to connect the different components, also called "blocks", of the System-on-Chip, and/or (ix) direct memory access controllers to route data directly between external interfaces and memory, bypassing the CPU or control unit, thereby increasing the data throughput (the amount of data processed per time) of the SoC.

Waveform Processing Example—SoC Xilinx Zynq

Xilinx SoCs are processor-centric platforms that offer software, hardware and I/O programmability in a single chip. The Zynq-7000 family is based on the SoC architecture. Zynq-7000 products incorporate a dual core ARM Cortex-A9 based Processing System (PS) and Xilinx Programmable Logic in a single device.

Waveform Processing Example—Xilinx Zynq-70005

Zynq-70005 devices feature a single-core ARM Cortex™-A9 processor mated with 28 nm Artix®-7 based programmable logic, 6.25 Gb/s transceivers and outfitted with commonly used hardened peripherals.

Waveform Processing Example—Xilinx Zynq-7000

Zynq-7000 devices are equipped with dual-core ARM Cortex-A9 processors integrated with 28 nm Artix-7 or Kintex®-7 based programmable logic, up to 6.6M logic cells, and with transceivers ranging from 6.25 Gb/s to 12.5 Gb/s.

The phrase "RF generator" refers to an electronic component capable of generating, transmitting, and/or receiving radiofrequency communication signals of varying types. In one embodiment, the RF generator can generate 3-4 waveforms to mimic military communications. In non-limiting preferred embodiments, the waveforms include modern software defined radio (SDR) waveforms, CDL (Common Data Link), TCDL (Tactical CDL), Bandwidth-Efficient CDL, Digital Data Link (DDL), Harris Adaptive Networking Wideband (ANW2) Waveform, Harris AN/PRC-117G radio 30 MHz-2 GHz waveform (ANW2), Harris AN/PRC-152A waveform, MAGTF CLT, USA BCT, Soldier Radio Waveform (SRW), SRW narrowband by Harris and TrellisWare, Wideband Networking Waveform (WNW), MUOS satellite waveform, Single Channel Ground and Airborne Radio System (SINCGARS) at 30-87.975 MHz e.g. at 111 hops per second, the HAVE QUICK-I/II waveform having 225 MHz to 400 MHz waveband, UHF 300 MHz-3 GHz, VHF 30 MHZ-300 MHz, broadband Mobile Ad Hoc Networking (MANET) waveform, and Wide Band Networking Radio Waveform (WBNR), European Secure Software Radio (ESSOR), and Coalition Wideband Networking Waveform (COALWNW).

Example—CDL Waveform

Common Data Link (CDL) is a secure U.S. military communications protocol. It was established by the U.S. Department of Defense in 1991 as the U.S. military's primary protocol for imagery and signals intelligence. CDL operates within the Ku band at data rates up to 274 Mbit/s. CDL allows for full duplex data exchange. CDL signals are transmitted, received, synchronized, routed, and simulated by Common data link (CDL) Interface Boxes (CIBs).

Example—Tactical CDL Waveform

The Tactical Common Data Link (TCDL) is a secure data link being developed by the U.S. military to send secure data and streaming video links from airborne platforms to ground stations. The TCDL can accept data from many different sources, then encrypt, multiplex, encode, transmit, demultiplex, and route this data at high speeds. It uses a Ku narrowband uplink that is used for both payload and vehicle control, and a wideband downlink for data transfer. The TCDL uses both directional and omnidirectional antennas to transmit and receive the Ku band signal. The TCDL is designed for UAVs, specifically the MQ-8B Fire Scout, as well as manned non-fighter environments. The TCDL transmits radar, imagery, video, and other sensor information at rates from 1.544 Mbit/s to 10.7 Mbit/s over ranges of 200 km. It has a bit error rate of 10e-6 with COMSEC and 10e-8 without COMSEC. It is also intended that the TCDL will in time support the required higher CDL rates of 45, 137, and 274 Mbit/s.

Example—DDL Waveform

The Army developed digital data link (DDL) system for use in unmanned aircraft systems (UAVs). The DDL design incorporates aspects of a software-defined radio with the ability to "field-select" the frequency band in which to operate, the channel frequency within that band, the bandwidth of each channel, and the radiated power level.

Example—SRW Waveform

The Soldier Radio Waveform (SRW) supports a discrete a set of bandwidths, has a frequency range form 225 MHz to 420 MHz; and from 1.350 GHz to 2.500 GHz, has a maximum data rate of 2 Mbps, and uses a multiple access channel (MAC) method of hybrid CSMA/TDMA.

Example—WNW Waveform

The Wideband Networking Waveform (WNW) uses a selection of operating modes including Orthogonal Frequency Domain Multiple Access (OFDM-WB) mode, Anti-jam (WB) mode, BEAM (NB) mode, and LPI/LPD (Low Probability of Intercept/Detection—spread) mode, has a Frequency Range from 225 to 420 MHz; 1.350 to 1.390 GHZ 1.755 to 1.850 GHz, has a Maximum data rate of 5 Mbps, and uses MAC method USAP/TDMA.

Example—ANW2

The Harris Networking Waveform (ANW2) has a range of bandwidths from 500 KHz to 5 MHz, a range of data rates up tp 10 Mbps RF generators may also be equipped to include cellular signals and their graphically visible waveforms, such as LTE, TDMA, FDMA, CDMA, WiMax, HSPA+, EV-DO, etc.

The term "RF", as used herein, is intended to be understood in its broad sense as including the full spectrum of radio frequencies from about 1 megahertz (MHz) to about 300 gigahertz (GHz).

The term "decoy" as used herein refers to a device that generates false RF signals that look like the collective signal signature of a group, the electronic "chatter" that is generated by a military formation such as a military command (>100,000 persons), a corps (20,000-50,000), a division (6000-20,000), a brigade/regiment (3000-5000), a battalion (300-1000), a company/squadron/battery (80-250), a platoon/troop (26-55), a section/patrol (12-24), a squad (8-12), or a team (2-4). The term decoy as used herein does not refer to a physical structure that gives a false radar signature, or to an electronic reflector/transmitter that transmits a false radar signature of a physical structure.

Figure 1:
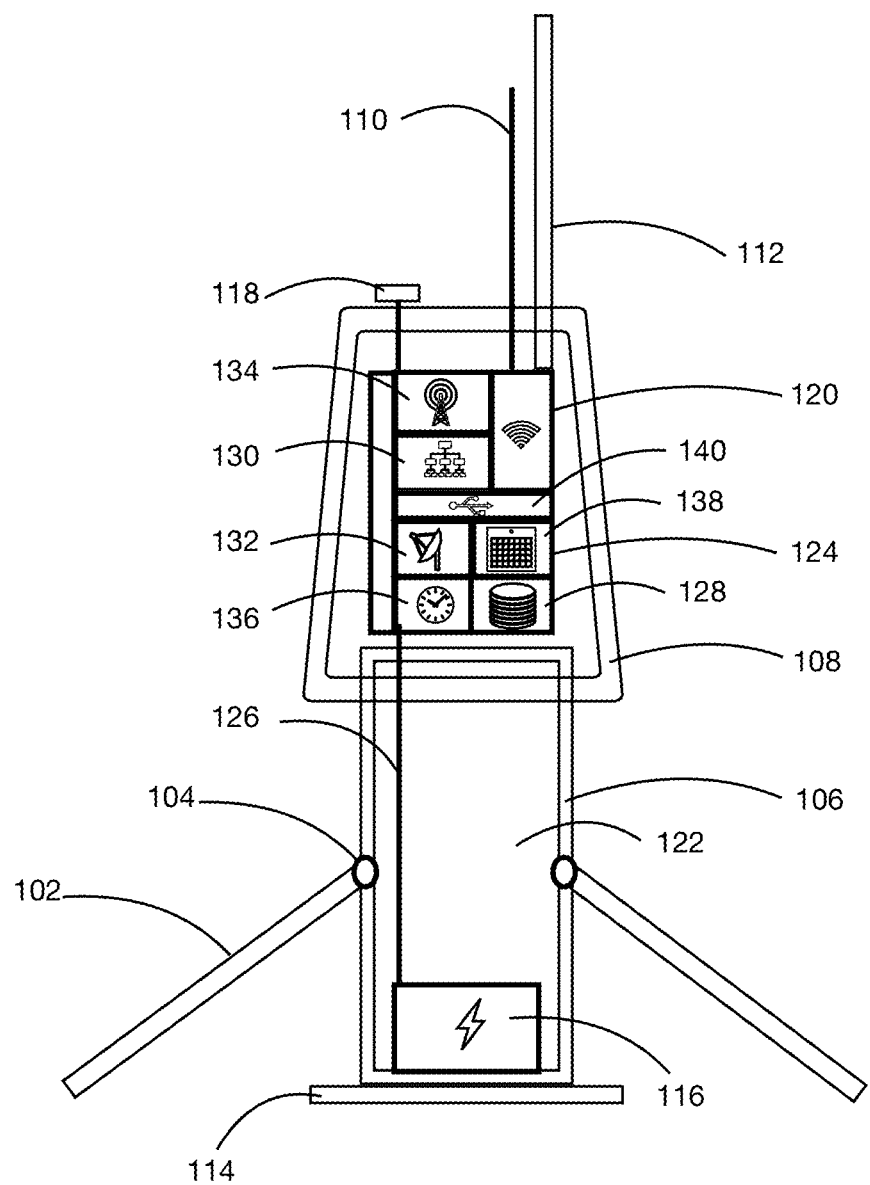
FIG. 1 is an illustration of one non-limiting example of a single decoy unit having multiple antennas and mounted on a foldable tripod base.

Referring now to the drawings, FIG. 1 is an illustration of one non-limiting example of a single decoy unit having multiple antennas and mounted on a base having foldable support legs. FIG. 1 shows base support leg(s) 102 attached to folding hinge connector 104 to connect the support leg(s) 102 to the extendable central support post 106. The main electronics housing 108 is mounted on top of the central support post 106, and the antenna(s) 110, 112 and control knob 118 are mounted on top of the housing 108. Pedestal footer 114 is attached to the bottom of central support post 106. Battery 116 is stored within central cavity 122 inside of the hollow cylinder of central support post 106. Battery 116 supplies power to the RF components 120 and SOC 124 via power supply 126. The RF components 120 include antenna interface, duplexer, power amplifier, BP filter, 1st mixer, 1st LO, IF filter, ADC, modem/DSP, DAC, baseband processor, 2d IF filter, 2d mixer, 2d LO, LNA, and 2d BP filter— notionally represented as RF circuit/electronics 140. The RF components may also optionally include memory 128, network card-ports-processor 130, accelerometer, a CODEC, a GPS receiver and processor 132, repeater, network antenna 134, GPS-denied network clocking synchronizer 136, pre-programmed remote activation scheduler 138, and duplicate, redundant electronic pathways and circuitry to make the unit radiation-hardened. In one preferred embodiment, the RF components are provided using a System on Chip (SoC). The SoC may include one or more processor(s), memory, I/O, storage, WiFi module programming for transmit-receive RF module, waveform signature(s) module, RF control module, and a power supply module.

Figure 2:
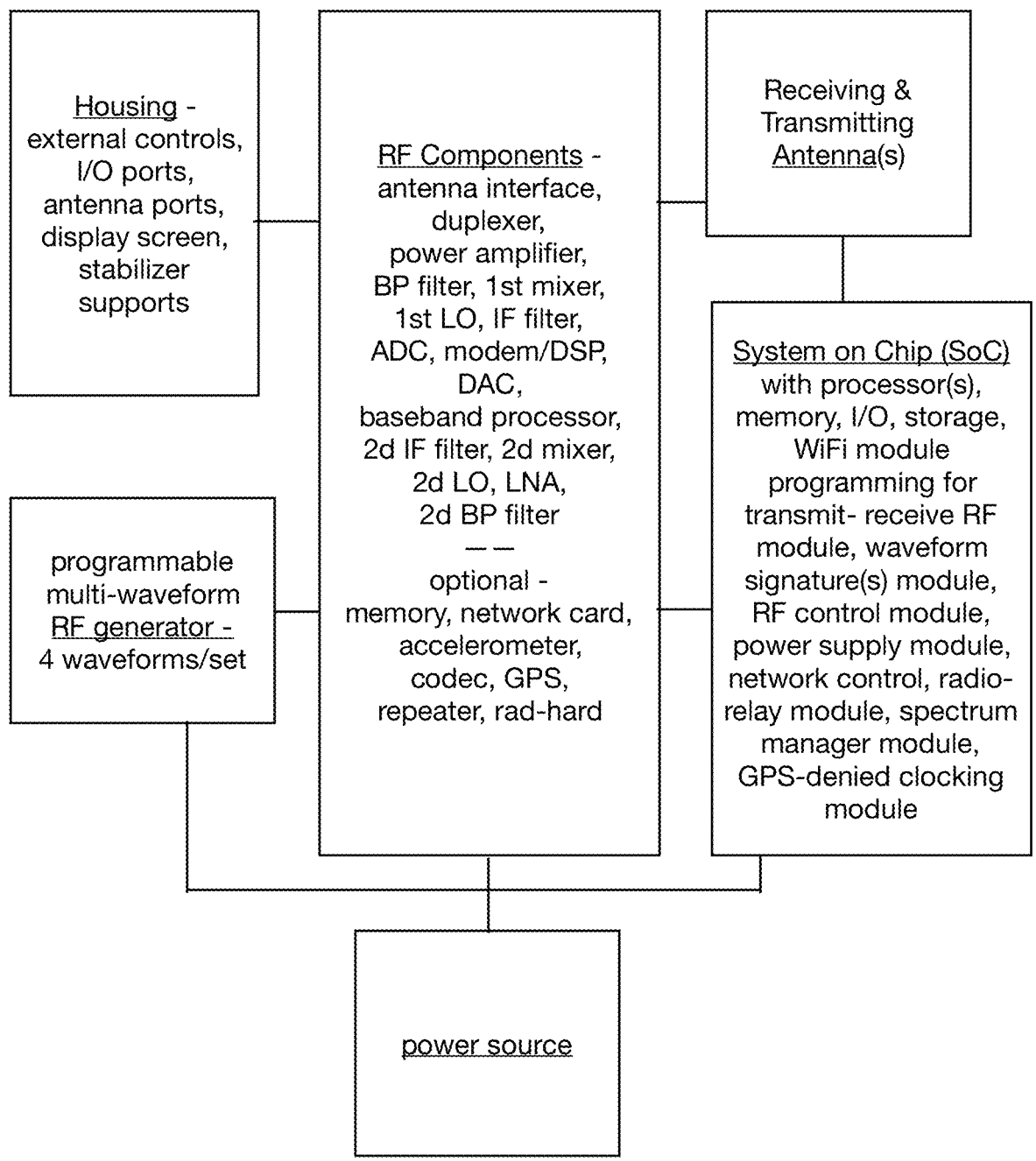
FIG. 2 is a schematic diagram that illustrates the generic components of the system of the invention.

FIG. 2 is a schematic diagram that illustrates the generic components of the system of the invention. FIG. 2 shows in a non-limiting example, the system may comprise a housing 202, RF components 204, an RF generator 208, antennas 206, processing such as a System on Chip 210, and a power source 212. The housing 202 includes external controls, I/O ports, antenna ports, a display screen, and stabilizer supports (legs). The RF components 204 include antenna interface, duplexer, power amplifier, BP filter, 1st mixer, 1st LO, IF filter, ADC, modem/DSP, DAC, baseband processor, 2d IF filter, 2d mixer, 2d LO, LNA, and 2d BP filter. The RF components may also optionally include memory, network card-ports-processor, accelerometer, a CODEC, a GPS receiver and processor, repeater, and duplicate, redundant electronic pathways and circuitry to make the unit radiation-hardened. The System on Chip (SoC) 210 includes processor(s), memory, I/O, storage, WiFi module programming for transmit-receive RF module, waveform signature(s) module, RF control module, and a power supply module.

Figure 3:
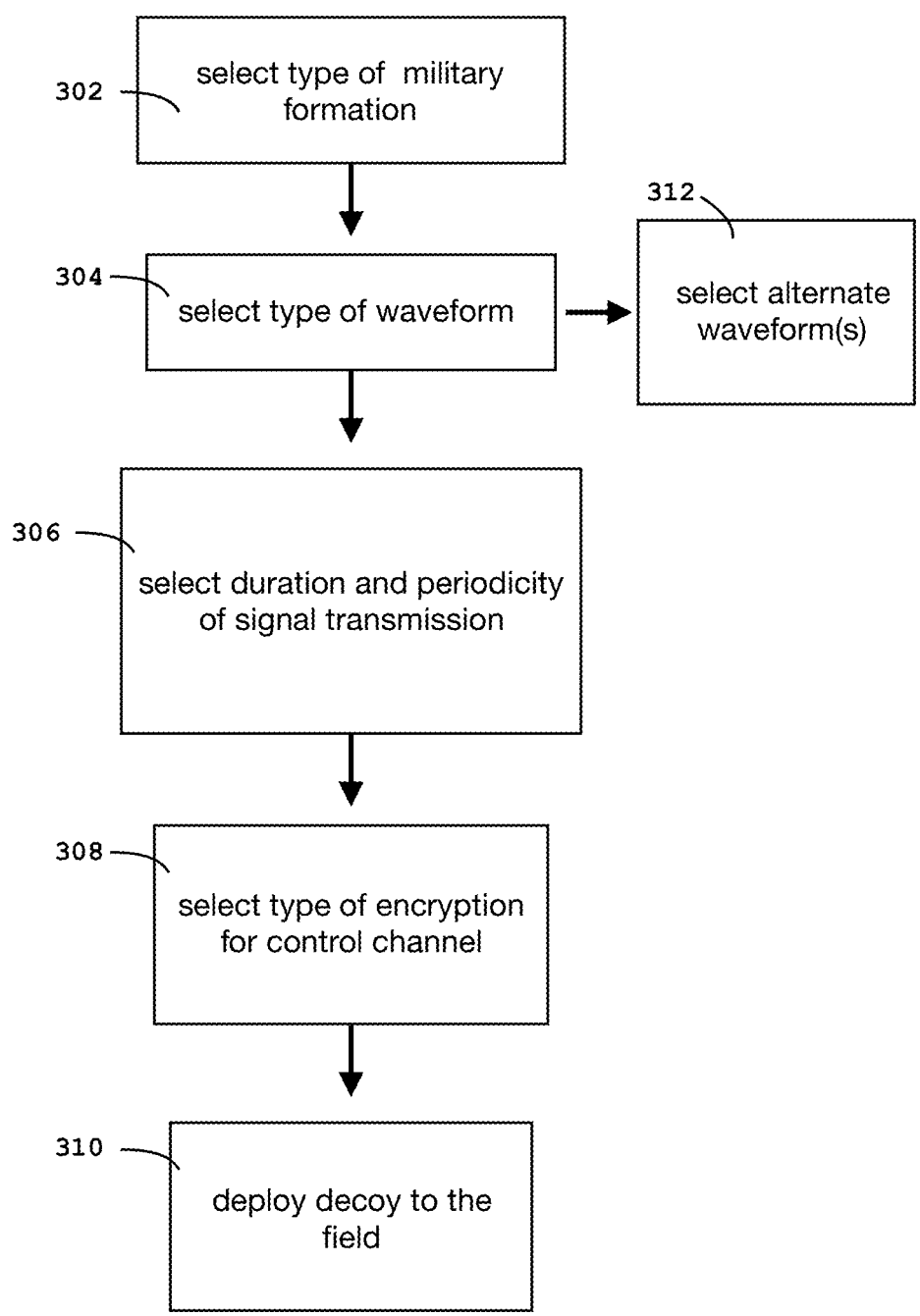
FIG. 3 is a schematic diagram that illustrates an example of a User interaction in setting up one of the devices of the system.

FIG. 3 is a schematic diagram that illustrates an example of a User interaction in setting up one of the devices of the system. FIG. 3 shows in a non-limiting example, the process may comprise the steps of (i) selecting the type of military formation that a user wishes to emulate 302, (ii) selecting the type of waveform that is representative of those types of formations from a programmed sub-menu 304, (iii) pre-selecting alternate waveforms for fast re-programming 312, (iv) selecting the duration and periodicity of signal transmission 306, (v) selecting the type of desired signal characteristics such as the control channel used for encryption and the type of encryption such as AES/DES 308, and (vi) deploying the activated decoy to the field and running any networking and collaboration routines/programming to establish the desired global or system-wide arrangement of decoys 310.

Figure 4:
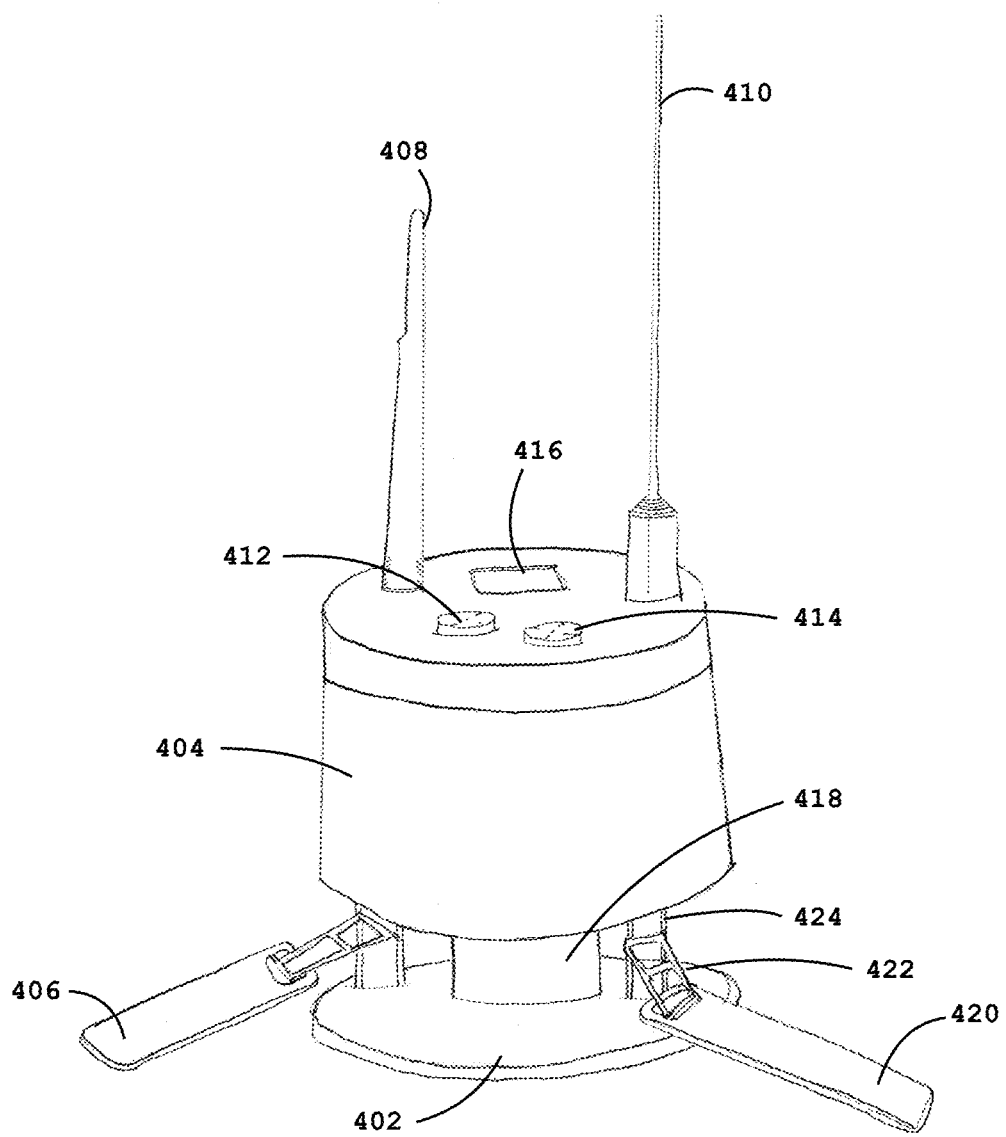
FIG. 4 is an illustration of one non-limiting example of a single decoy unit having articulating tripod legs and multiple antennas.

FIG. 4 is an illustration of one non-limiting example of a single decoy unit having articulating tripod legs and multiple antennas. FIG. 4 shows an example unit that has a "pop-up" storage and deployment feature where the unit is stored in a closed cannister configuration, and is activated by sliding the bottom footer 402 away from the decoy body 404 and deploying the articulating stabilizer legs 406. This example shows a device have two different types of antennas 408, 410, two control knobs 412, 414, a display window 416 in a cylindrical housing 404 having a center post 418 for sliding the unit between the open and closed positions, a circular base or footer 402, and multiple (3-6) articulating legs 406 that each have a contact pad 420 connected to an adjustment arm 422 that is (slidably) connected to a vertical support member 424 mounted within the cylinder of the housing.

Figure 5:
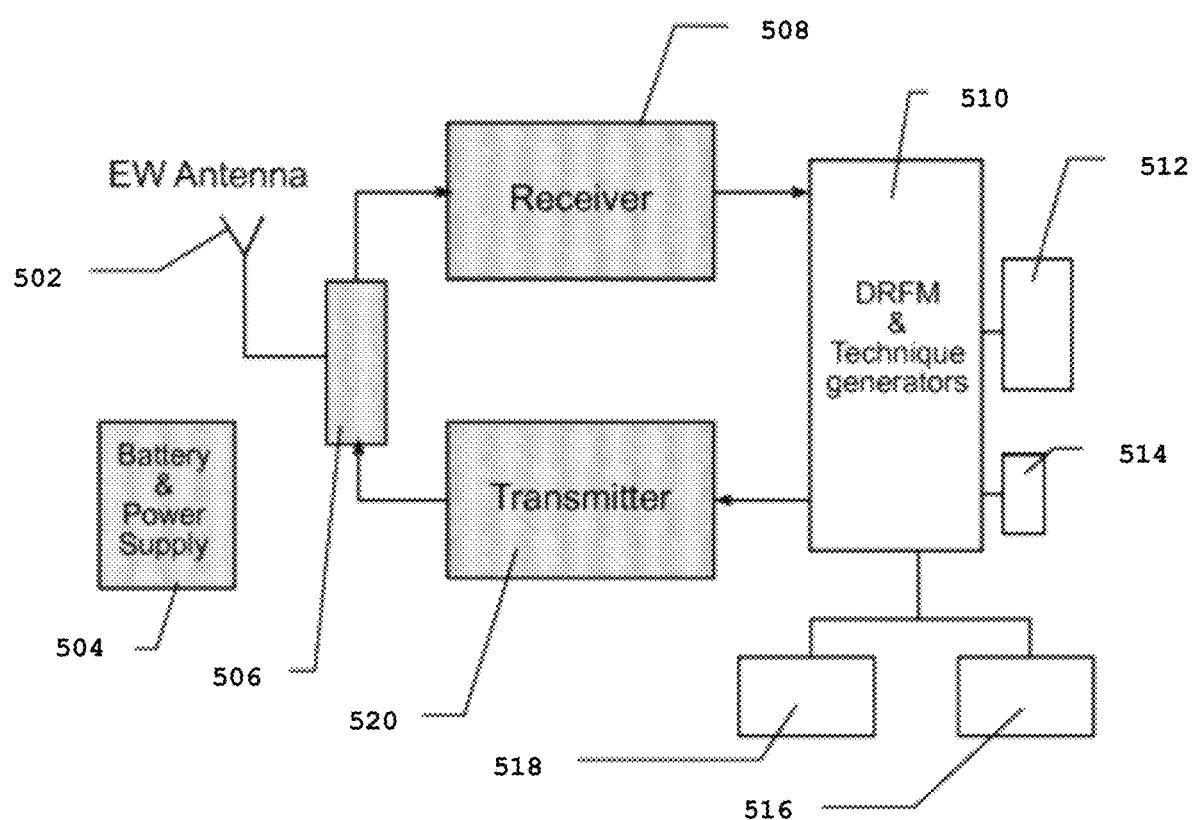
FIG. 5 is non-limiting example of an electrical block diagram of an RF decoy of the invention.

FIG. 5 is non-limiting example of a generic electrical block diagram of an RF decoy of the invention. FIG. 5 shows an antenna 502, a battery 504, antenna interface 506, and receiver module 508. Digital Radio Frequency Modulation and other DSP processing is handled at generator 510. Waveform external control module 512 and WiFi and GPA location module 514 are shown in communication with generator system 510. Repeater unit 516 and rad-hard redundancy module 518 are shown also in communication with generator system 510. Transmitter 520 is in circuit and any transmission signal is transferred to the antenna 502 through interface 506.

Figure 6:
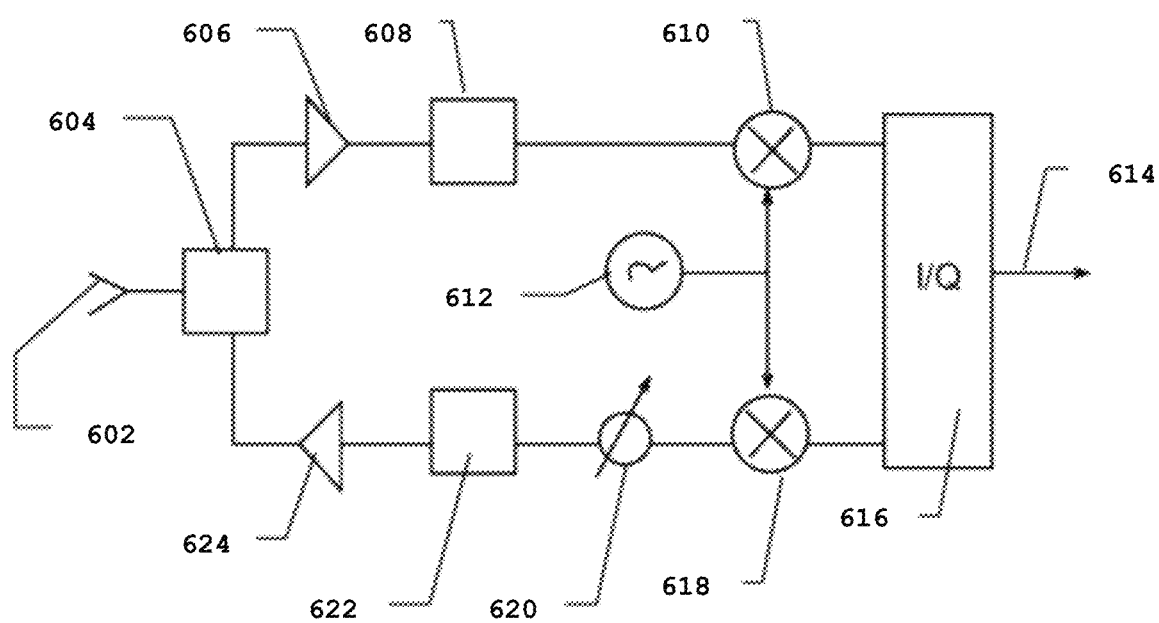
FIG. 6 is non-limiting example of a layout of the RF board inside an RF decoy of the invention.

FIG. 6 is non-limiting example of a layout of the RF board inside an RF decoy of the invention. FIG. 6 shows antenna 602 attached to antenna interface and/or duplexer 604. Antenna interface 604 on the receive channel connects to a low noise amplifier 606, a band pass filter 608 and a LO/balanced mixer 610. The transmit channel includes a DSP/synthesizer unit 612 and a processor unit 614 that may contain ADC/DAC, MODEM, and other secondary DSP aspects, including I/O outputs at 614. The transmit channel then continues with the second LO/balanced mixer 618, optional phase shifter or IF filter 620, a band pass filter 622, a high power amplifier 624 and then back to the antenna interface 604/switch.

FIG. 7 is non-limiting example of a top view and a bottom view layout of an example of a digital board inside an RF decoy of the invention. FIG. 7 shows an example of a layout of the Digital Board including digital processors, analog to digital converters, digital to analog converters, memory units and programmable gate arrays. The real time software that controls the mission of the RF decoy resides in this Digital Board.

Figure 8:
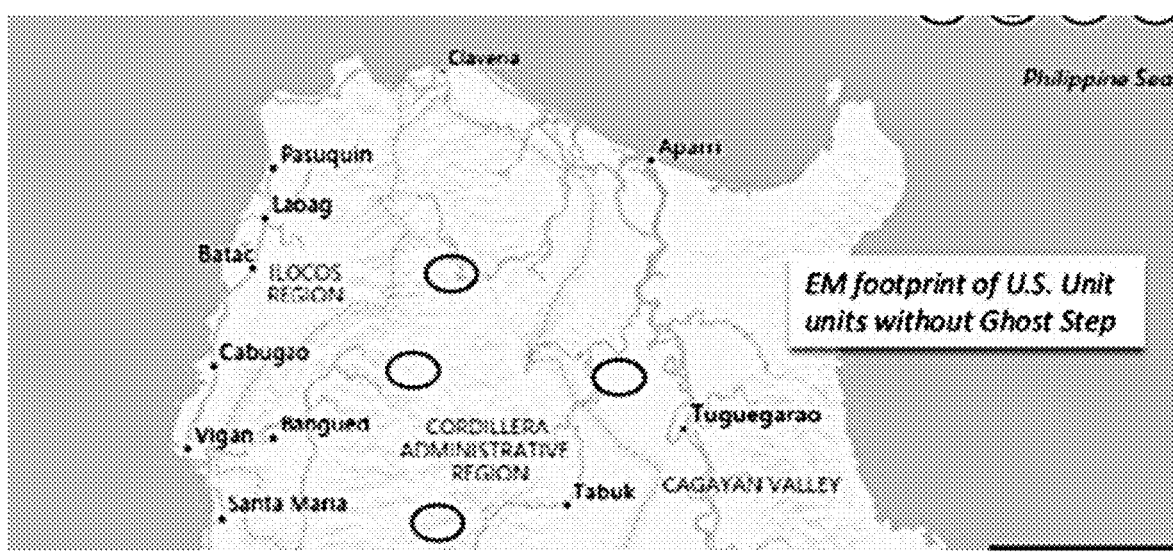
FIG. 8 is a graphic illustration of an example of an electromagnetic (EM) footprint of a set of hypothetical U.S. units, before the inventive decoy device is deployed.

FIG. 8 is a graphic illustration of an example of an electromagnetic (EM) footprint of a set of hypothetical U.S. units, before the inventive decoy device is deployed.

Figure 9:
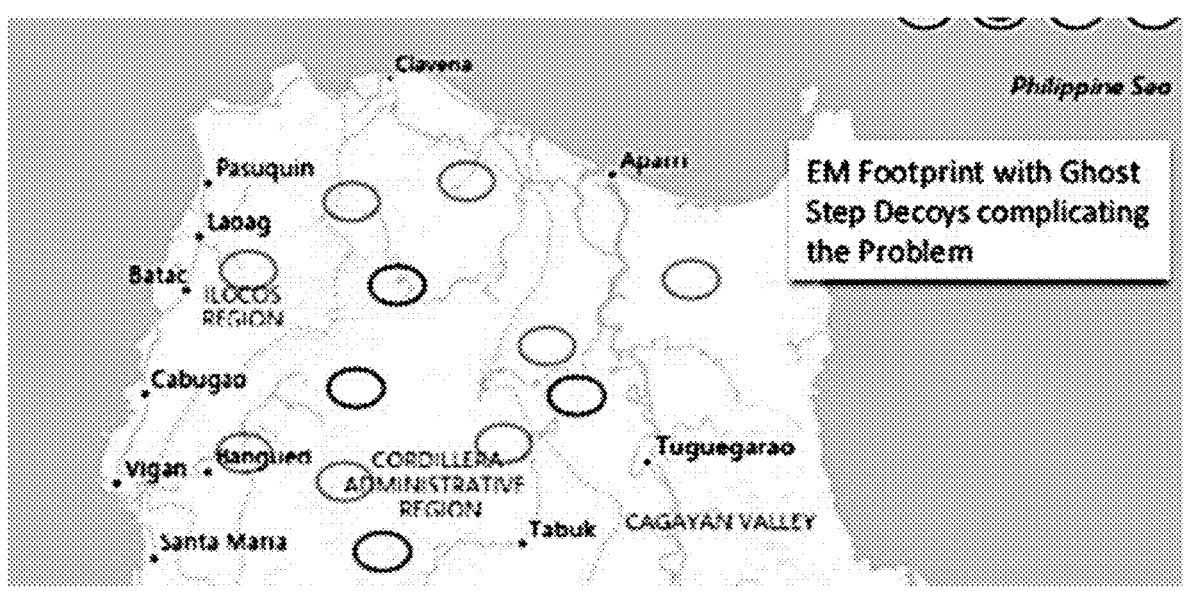
FIG. 9 is a graphic illustration of an example of an electromagnetic (EM) footprint of a set of hypothetical U.S. units combined with the deployment of eight (8) decoy devices.

FIG. 9 is a graphic illustration of an example of an electromagnetic (EM) footprint of a set of hypothetical U.S. units combined with the deployment of eight (8) decoy devices.

Figure 10:
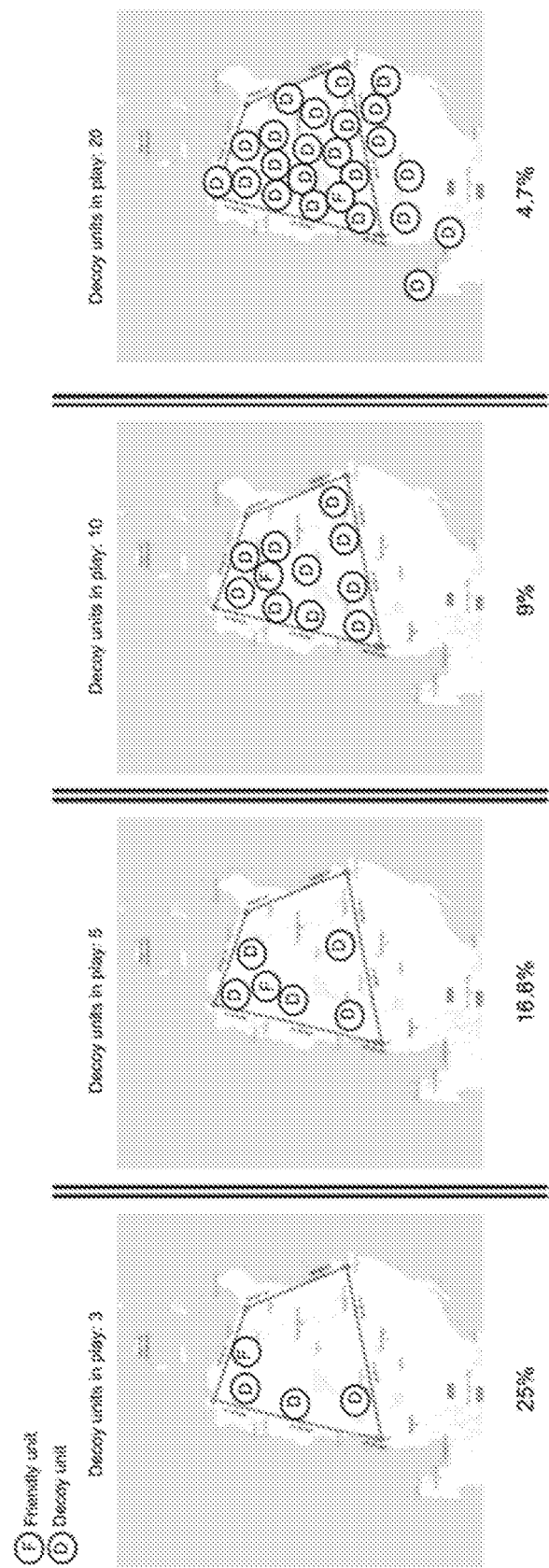
FIG. 10 is a multi-part series of four (4) graphic illustrations of an example of an electromagnetic (EM) footprint of a set of hypothetical U.S. units combined with the an increasing number of deployed decoy devices and shows the decreasing chances by percentage that a friendly unit will be successfully targeted when an increasing number of decoys are used.

FIG. 10 is a multi-part series of four (4) graphic illustrations of an example of an electromagnetic (EM) footprint of a set of hypothetical U.S. units combined with the an increasing number of deployed decoy devices and shows the decreasing chances by percentage that a friendly unit will be successfully targeted when an increasing number of decoys are used.

Figure 11:
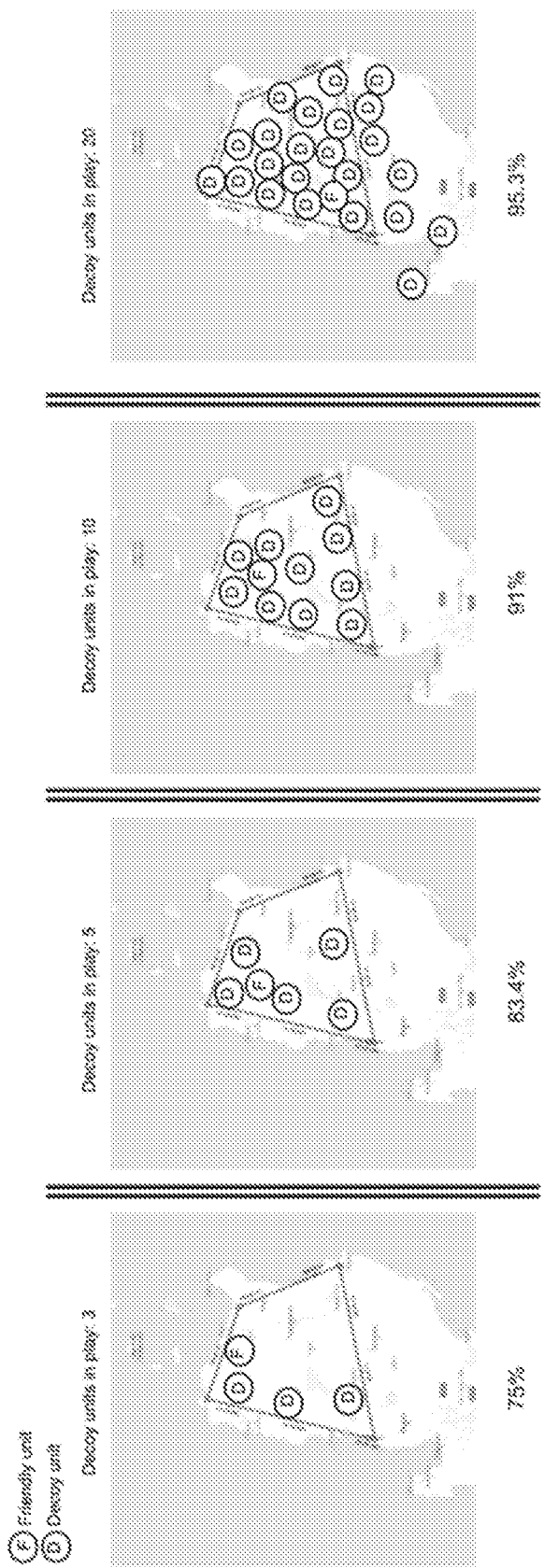
FIG. 11 is a multi-part series of four (4) graphic illustrations of an example of an electromagnetic (EM) footprint of a set of hypothetical U.S. units combined with the an increasing number of deployed decoy devices and shows the increasing chances by percentage that a friendly unit will successfully evade targeting when an increasing number of decoys are used.

FIG. 11 is a multi-part series of four (4) graphic illustrations of an example of an electromagnetic (EM) footprint of a set of hypothetical U.S. units combined with the an increasing number of deployed decoy devices and shows the increasing chances by percentage that a friendly unit will successfully evade targeting when an increasing number of decoys are used.

Figure 12:
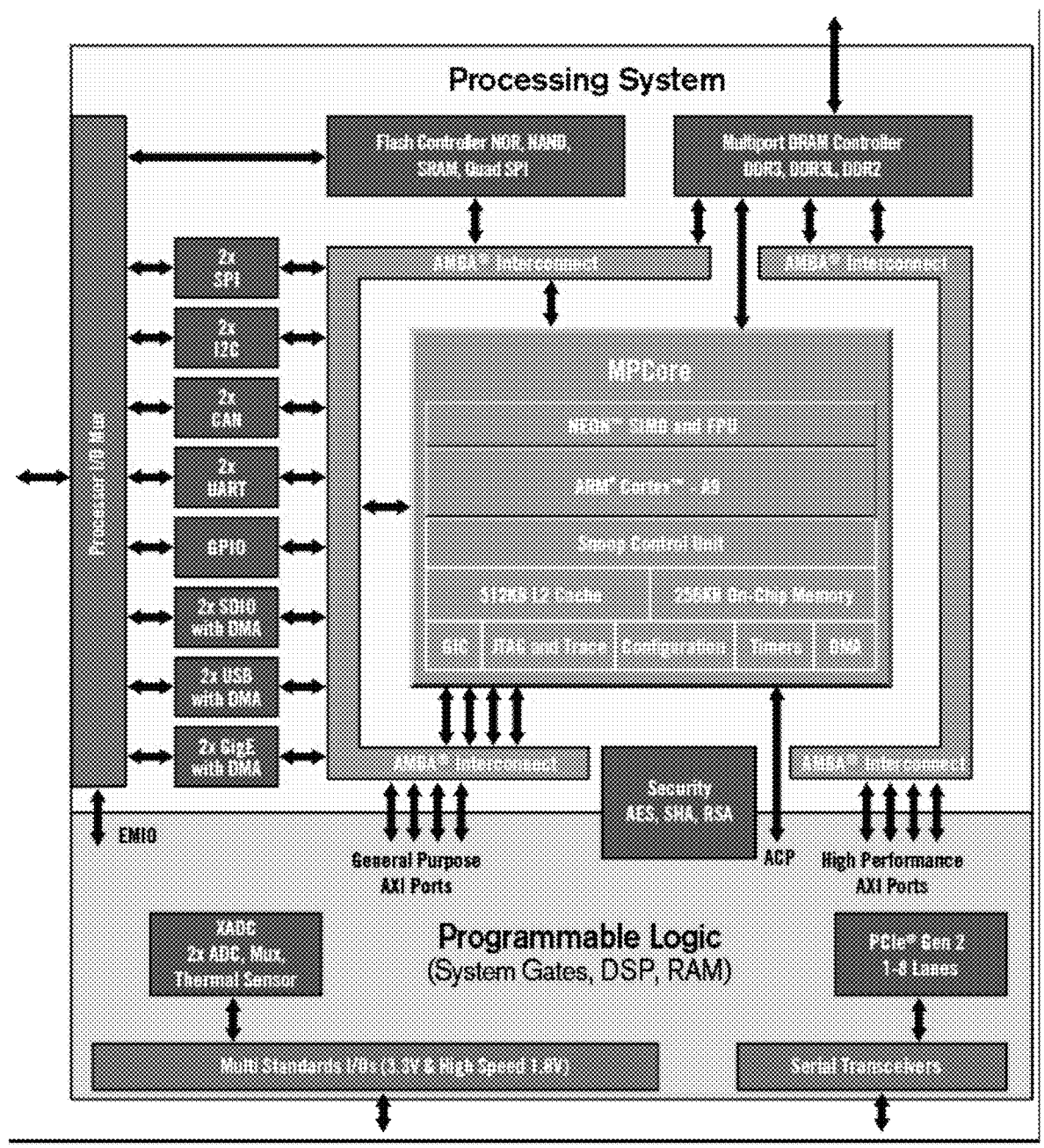
FIG. 12 is a integrated circuit chip block diagram for a Zynq-7000S device and shows a single-core ARM Cortex™-A9 processor mated with 28 nm Artix®-7 based programmable logic, 6.25 Gb/s transceivers and outfitted with commonly used hardened peripherals.

FIG. 12 is a integrated circuit chip block diagram for a Zynq-70005 device and shows a single-core ARM Cortex™-A9 processor mated with 28 nm Artix®-7 based programmable logic, 6.25 Gb/s transceivers and outfitted with commonly used hardened peripherals.

Figure 13:
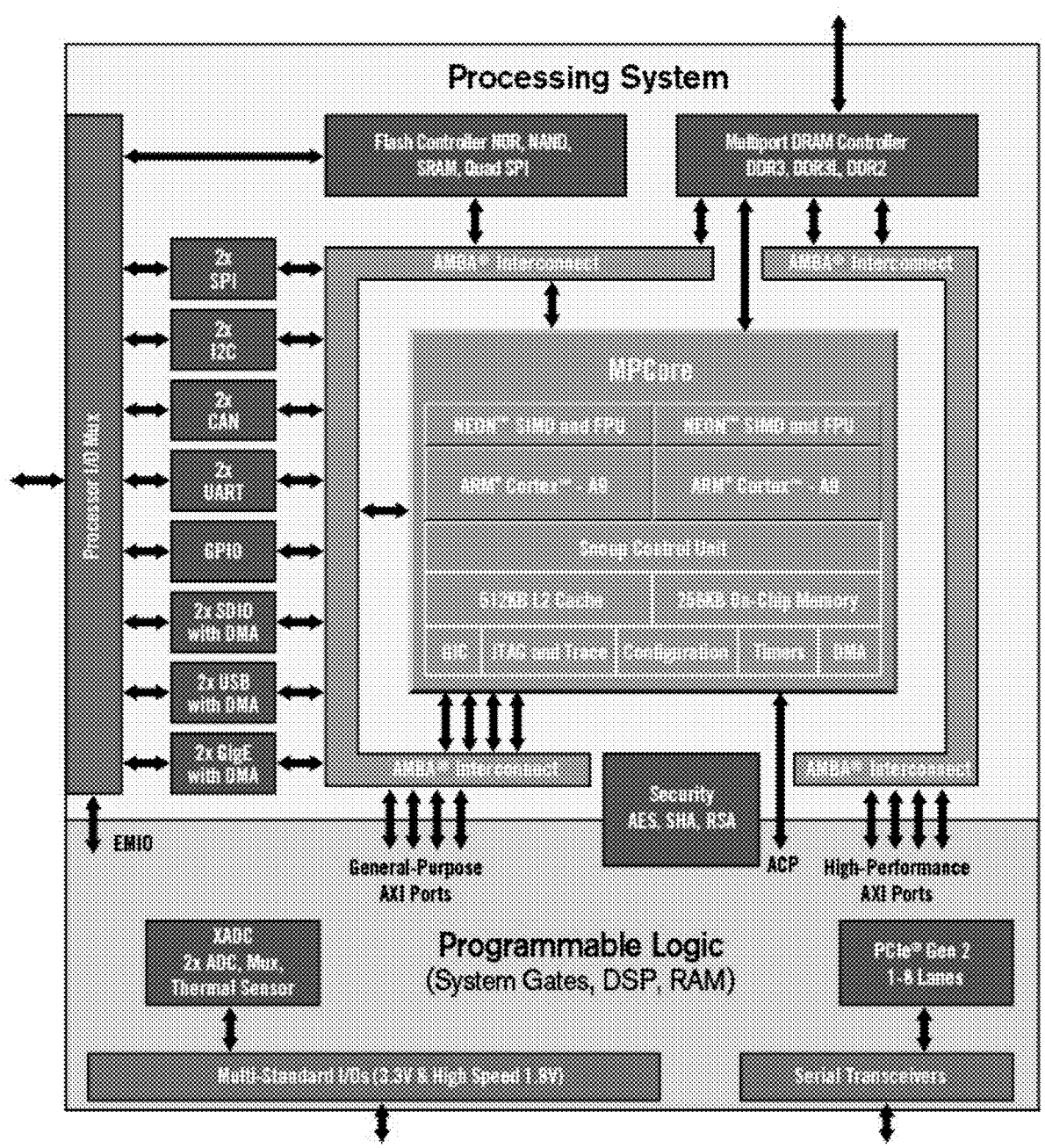
FIG. 13 is a integrated circuit chip block diagram for a Xilinx Zynq-7000 device and shows dual-core ARM Cortex-A9 processors integrated with 28 nm Artix-7 or Kintex®-7 based programmable logic, up to 6.6M logic cells, and with transceivers ranging from 6.25 Gb/s to 12.5 Gb/s.

FIG. 13 is a integrated circuit chip block diagram for a Xilinx Zynq-7000 device and shows dual-core ARM Cortex-A9 processors integrated with 28 nm Artix-7 or Kintex®-7 based programmable logic, up to 6.6M logic cells, and with transceivers ranging from 6.25 Gb/s to 12.5 Gb/s.

FIG. 14 is an illustration of a block diagram in accordance with the present invention. FIG. 14 shows an MPSoC having an Application Processing Unit Quad Arm A53 in communication with an FPGA programmable logic chip. The FPGA programmable logic chip is in communication with a Real Time Processing Unit Dual Arm R5, and a Platform Management Unit and a Cyber Security Unit/Module. The FPGA programmable logic is also in communication with peripheral controllers for peripherals, and with memory controllers for multiple DDR modules.

FIG. 15 is an illustration of a circuit diagram in accordance with the present invention. FIG. 15 shows a High Intermediate Frequency (IF) Heterodyne Receiver connected to a Direct RF Sampling receiver having an all programmable RFSoC with a DDC connected to a RFADC. The Local Oscillator (LO) feeds a signal into the RF A-D converter which is in communication with a bandwidth Phase Filter (BPF) and an Anti-Aliasing Filter (AAF). The BPF and AAF feed into the low noise amplifier (LNA) which is connected to the antenna assembly.

FIG. 16 is an illustration of an electronics chassis in accordance with the present invention. FIG. 16 shows chassis laying on its side and viewing down the interior cavity from the top end towards the bottom end. The chassis is configured as a rectangular open-ended box having four side panels.

Three of the four exterior side panels have an array of longitudinal radiative fins running the length of the chassis from top to bottom. The fourth exterior side panel is smooth and includes openings for input, output, control, access, and so forth. The interior of the chassis includes ribs and channels for mounting the RF components and other electronics. The radiative fins are used to radiate excess heat that is generated by the RF broadcast away from the decoy unit to protect the electronics from thermal damage.

In a preferred embodiment, the chassis (or sections thereof) is constructed using radio-opaque composites. Radio-opaque composites according to the present invention include a base chassis material infused with a radio-opaque additive such as barium sulfate, bismuth compounds, and tungsten compounds. Base materials include polymers, glasses, ceramics, metals, metal alloys, and composite materials.

Non-limiting examples of polymers may include polycarbonates, HD- and LD-polyethylenes, polypropylenes, polyvinylchlorides, polystyrenes, nylons, polytetrafuoroethylenes, thermoplastic polyurethanes, polyacrylates, polyamides, polysulfides, polysulfones, polysilicones, polysiloxanes, polyaramids, polyimides, halogenated polymers, polyacrylonitrile, carbon polymers, carbon sheets, carbon nanomaterials, and co-polymers of the above. Non-limiting examples of glass may include silica glass, fused-silica glass, soda-lime glass, lead glass, borosilicate glass, aluminosilicate glass, and fiberglass. Non-limiting examples of metals and metal alloys may include aluminum, steel, nickel, copper, titanium, and zinc. Non-limiting examples of composite materials may include a homogenous material having fibers of a second material, a first material coated by a second material, and combinations and permutations of materials doped and/or coated in multiple layers having radio-opaque functionality.

Housing

Referring to the housing, it is contemplated as within the scope of the invention that the housing may be constructed of metal, metal alloy, polymer, ceramic, and composite materials. The housing may be a unitary construction or may be assembled in a modular manner. The housing may be weather-proofed using gaskets, seals, and coating.

The housing has one or more antenna ports for attaching the external portion of antennas, as well as external user controls, I/O ports, an optional display screen, as well as attachment hardware for stabilizer supports.

In one embodiment, the device is folded into a compact form factor and upon deployment is manually or automatically unfolded and opened. In one embodiment, the unit has foldable stabilizer legs, such as tripod. In another aspect, the legs may be articulatable and adjustable. In some preferred embodiments the articulatable legs may be adjustable along an x-axis, or along both an x- and y-axis (up/down, side-to-side), or along an x-, y-, and z-axis (up/down, side-to-side, rotationally).

In a non-limiting preferred embodiment, the housing dimensions are no larger than approximately 12"h×6"w×6"d, although the unit itself may be asymmetrical. In another non-limiting embodiment, the housing is no larger than 18"h×9"w×9"d. In another non-limiting embodiment, the housing is no larger than 24"h×12"w×12"d.

In a non-limiting, preferred embodiment, the housing includes a chassis as shown in FIG. 16.

Operating Frequencies

Referring now to FIG. 17, there is a graph showing operating frequencies of commercial cellular transmissions compared to battlefield waveforms. Mobile phones in the United States operate at different frequencies based on carrier, uplink/downlink, and generation. In general, 2G and 3G cellular phones operate at 850 MHz uplink, and 1,900 MHz downlink with average transmission speeds of 0-5 Mbps. 4G cellular phones operate mainly at 1700 MHz uplink, and 2100 MHz downlink with average transmission speeds of 5-12 Mbps. To compare to military-based operations, we overlay these frequencies and data rates on a chart displaying demonstrated throughput of the various MANET waveforms of interest. The 4G waveforms exist in a desirable section of the tradespace with higher data rates than achieved by both legacy and MANET waveforms, but in the same frequency range as both the SRW and WNW systems.

Antenna

Referring to the antenna, it is contemplated as within the scope of the invention that the antenna is selected from the group consisting of: a phase array antenna, Wire Antennas selected from a Short Dipole Antenna, a Dipole Antenna, a Half-Wave Dipole, a Broadband Dipoles, a Monopole Antenna, a Folded Dipole Antenna, a Loop Antenna, and a Cloverleaf Antenna, Travelling Wave Antennas selected from a Helical Antenna, a Yagi-Uda Antenna, and a Spiral Antenna, Reflector Antennas selected from a Corner Reflector, and a Parabolic Reflector (Dish Antenna), Microstrip Antennas selected from a Rectangular Microstrip (Patch) Antenna, and a Planar Inverted-F Antenna (PIFA), Log-Periodic Antennas selected from a Bow Tie Antenna, a Log-Periodic Antenna, and a Log-Periodic Dipole Array, Aperture Antennas selected from a Slot Antenna, a Cavity-Backed Slot Antenna, a Inverted-F Antenna, a Slotted Waveguide Antenna, a Horn Antenna, a Vivaldi Antenna, and Other Antennas selected from a NFC Antenna, and a Fractal Antenna.

RF Components/Circuit

Referring to the RF components it is contemplated as within the scope of the invention that the RF components may include a clocking circuit, a duplexer, a power amplifier, a band pass filter, a mixer, a local oscillator, an intermediate frequency filter, a modulator/demodulator, digital signal processor and DSP programming, analog-to-digital (ADC) and digital-to-analog (DAC) converters, a baseband processor, a second intermediate frequency filter, a second mixer, a second local oscillator, a low noise amplifier, a second band pass filter.

Additional optional RF components may include memory, including PROM, Flash, SDRAM, EEPROM, DSP components, an accelerometer, a CODEC, GPS, repeater circuit, and networking hardware and programming for communicating with other local decoy devices.

It is also contemplated that the RF components may include may include specialized processors such as Field Programmable Gate Arrays (FPGAs) and Application Specific Integrated Chips (ASICs).

The RF components may also include radiation hardening designs such as providing multiple redundant logic and chip components arrayed in a non-linear spatial arrangement, and temporal latch technology with multiple parallel redundant processes running at off-set times and using a voting feature.

Networked Decoys

The networking aspect of the decoy system also contemplates that each decoy within an array or constellation may be programmed to transmit a specific waveform or signal pattern. In one non-limiting example, the system may be comprised of a 1st decoy or 1st group of decoys that is broadcasting a ground troop formation signal or signal set/waveform, a 2d decoy or 2d group of decoys is broadcasting an artillery signal or signal set/waveform, a 3d decoy or 3d group of decoys is broadcasting a reconnaissance signal or signal set/waveform, and a 4th decoy or 4th group of decoys is broadcasting a command signal or signal set/waveform.

Decoys as Repeaters

The repeater aspect of the decoy system also contemplates that each decoy within an array or constellation may be programmed to receive and re-transmit a specific waveform or signal pattern. In one embodiment, the signal may be received, processed, amplified, and re-transmitted. Processing may include demodulation-remodulation using a MODEM, decompression-recompression using a CODEC, decrypted-re-encrypted, and noise reduced using a filter or software to reduce or eliminate noise such as gaussian white noise, etc.

In one non-limiting example, the system may be comprised of a 1st decoy or 1st group of decoys that is broadcasting a military waveform signal or signal set/waveform, a 2d decoy or 2d group of decoys receives and re-transmits the military waveform signal or signal set/waveform.

In another non-limiting example, the battlefield decoy comprises a repeater module having programming code to receive and re-transmit a specific waveform or signal pattern as a bent-pipe repeater without additional digital signal processing.

In another non-limiting example, the battlefield decoy comprises a repeater module having programming code to receive, process, and re-transmit a specific waveform or signal pattern, wherein said processing comprises demodulation-remodulation using a MODEM, decompression-recompression using a CODEC, decryption-re-encryption, noise reduction using a filter or software to reduce or eliminate noise, and amplification.

Radio Transmitter

As contemplated within the scope of the invention, a radio transmitter consists of these basic components:

(i) A power supply circuit to transform the input electrical power to the higher voltages needed to produce the required power output;

(ii) An electronic oscillator circuit to generate the radio frequency signal, or carrier wave;

(iii) A modulator circuit to add the information to be transmitted to the carrier wave produced by the oscillator, such as by using different modulation methods including amplitude modulation, frequency modulation, etc.;

(iv)) A radio frequency (RF) amplifier, to increase the power of the signal, to increase the range of the radio waves; and (v) An impedance matching (antenna tuner) circuit, to match the impedance of the transmitter to the impedance of the antenna (or the transmission line to the antenna), to transfer power efficiently to the antenna.

Software Defined Radio

Software-defined radio (SDR) is a radio communication system where components that have been traditionally implemented in hardware (e.g. mixers, filters, amplifiers, modulators/demodulators, detectors, etc.) are instead implemented by means of software on a computer or embedded system. An SDR includes RF hardware, a Low-Noise Amplifier (LNA), and Intermediate Frequency (IF) Filter, analog-digital converter (ADC), a digital channel converter, a sampling rate converter, a Base Band processing system that includes a Base Band hardware processor such as a Field Programmable gate Array (FPGA), Digital Signal Processor (DSP), and/or an Application Specific Integrated Circuit (ASIC), and a Base Band software processor that may include a Virtual Radio Machine, one or more algorithms, Common Object Request Broker Architecture (CORBA), and other programming modules such as those provided in the GNU Radio software development toolkit (sdk) that provides signal processing blocks to implement software-defined radios and signal-processing systems with external RF hardware to create software-defined radios.

SDR Transmitter

An SDR transmitter is simply (1) an RF front-end (hardware) that includes an antenna, amplifier, filter, and optionally a D/A converter, coupled to (2) programming software code instructions for performing some or all of the following functions using a processor: modem, codec, encryption, network connection, routing, graphical user interface, and optionally ADC.

RF Generator

Referring to the programmable multi-waveform RF generator, it is contemplated as within the scope of the invention that the the programmable multi-waveform RF generator is a configured to fit within a small form factor. The RF generator described herein is used for mimic'ing the signals, signal sets, or waveforms of military formations.

Multiple RF Waveforms

In a non-limiting preferred embodiment, the device is capable of producing up to 16 different signals simultaneously. In another preferred embodiment, waveforms are collected and saved in waveform sets. Waveforms sets include the typical waveform profile of a specific military formation or unit; one set per organization unit. For example, the invention includes a waveform set of frequencies for a Marine infantry unit, or an Army squad, platoon, company, artillery battery, battalion, regiment, brigade, army special forces, or a Navy ship, task unit, task group, task force, fleet, or Navy special forces, or Air Force flight group, squadron, wing, brigade, division, or Air Force special forces.

In a preferred embodiment, the device is programmable to transmit 4 waveform sets simultaneously.

In another preferred embodiment, the device allows for the waveform sets to be re-programmable to other groups of waveform sets. The programming can be established from local memory in the device, or it can be remotely downloaded from a network control, or custom set grouping using both local and remote waveform sets.

Example—4 Waveform Sets

In a non-limiting illustration, a decoy unit may be programmed to broadcast 4 simultaneous waveforms: a Marine infantry waveform set, an Artillery waveform set, a Special Forces waveform set, and an Air Force squadron waveform set.

Specifications that are contemplated as within the scope of the invention include an RF transmitter having a programmable and extensible wireless channel transmitter accommodating networks of 8 to 100 radio nodes operating in a frequency range of 2 MHz to 2 GHz. The transmitter should be high fidelity, broadband, have good delay and attenuation resolutions, a large dynamic range, low minimum latency, provide high isolation between radios, and emulate propagation delays of up to 1 second. The transmitter should handle radio networks using multiple protocols and waveforms, including full duplex, frequency agile, and power adaptable radios, through a single RF port per radio. The transmitter should be capable of running programmed protocols with time-varying losses, delays, multipath, Doppler, and statistical fading. It should also have a modular and scalable design that has 400 MHz input, and 250 MHz output bandwidths over 2-2000 MHz while offering a large transmitted receive signal dynamic range and high isolation full duplex operation with transmit powers from 1 mW to 200 W. The transmitter is waveform agnostic, may handles frequency agile radios, and may be configured to transmit up to 64 time-varying, high fidelity multipath channels. The transmitter may also establish and work in a radio network of 2-50 devices, with transmit and receive channels reserved for digital links to external controllers.

SoC

Referring to the System on a Chip, it is contemplated as within the scope of the invention that the SoC may contain software programming code for receiving and transmitting battlefield waveforms, a re-programming module for changing from a first waveform signature to a second waveform signature, an RF module for controlling the RF components in the RF housing. As stated, in a non-limiting preferred embodiment, the device is capable of producing up to 16 different signals simultaneously.

GPS

In a preferred embodiment, the unit is equipped with GPS receiver and location memory for recovery and re-use. Upon deployment, the unit can be programmed to receive GPS coordinates, which are then saved to memory. The unit may also be programmed to report it's GPS location to a central decoy operator or decoy operation server.

Power Supply

Referring to the power supply, it is contemplated as within the scope of the invention that the power supply may include an electric battery to provides the current and the voltage required for the entire period of operation of the RF decoy.

In a preferred embodiment, the power supply provides over 48 hours of continuous decoy transmission. Optionally, the device may be configured with a solar trickle charge unit and the unit may be programmed to temporarily power down during re-charging of the battery, and then re-initiate transmissions once the battery is charged.

In one preferred aspect, the preferred battery is a thermal battery that can be maintenance-free for a period of at least 10-15 years, being rechargeable or replaceable afterwards. The thermal battery is activated at the instance of the deployment by an appropriate mechanism. Alternatively, an alkaline battery, a lithium battery, NiCad battery, a hydrogen fuel cell, a polymer battery, a solar panel charged battery system, or a separate external battery linked to a a power charging port, may be used instead of the thermal battery.

It is contemplated as within the scope of the invention that the power supply unit is a DC to DC converter which accepts the voltage of the battery (at a nominal value of 12V) and transforms it to several regulated voltages (such as 8V, 5V, 3.3V, 1.8V, 1.2V etc).

Radiation Hardening

In another preferred embodiment, the invention provides a programmable battlefield decoy that further comprises a second System on a Chip that is configured in parallel to the (first) System on a Chip but is positioned away from the first System on a Chip and at a different orientation to provide RF hardening redundancy.

Software Defined Radio

In another preferred embodiment, the invention provides a programmable battlefield decoy wherein the RF components are implemented in a Software Defined Radio (SDR) as a software module on a personal computer or as an embedded System on a Chip.

Programmable

In another preferred embodiment, the invention provides a programmable battlefield decoy wherein the re-programming module for changing from a first waveform signature to a second waveform signature is operatively connected to a waveform update module that is configurable by receiving updated waveforms by direct hardware link through a update port in the housing, or by a wireless link through a wireless transceiver.

In another preferred embodiment, the invention provides a programmable battlefield decoy that has a small form factor housing that is no larger in dimension than 12"×6"×6".

Network Clocking

Clocking determines how individual decoys or entire decoy networks sample transmitted data. As streams of information are received by a decoy in a network, a clock source specifies when to sample the data.

In asynchronous networks, the clock source is derived locally, whereas in synchronous networks a central, external clock source is used. Interface clocking indicates whether the decoy uses asynchronous or synchronous clocking. In a battlefield situation it is highly probable that that GPS signals, which are often used for clocking, will be jammed resulting in a GPS-denied communication environment. In this situation, the decoys will need to be able to maintain successful communications. Accordingly, a clocking synchronization module is provided to allow, in one preferred embodiment, decoy networks that are designed to operate as an asynchronous network, where each decoy generates its own clock signal, or decoys use clocks from more than one clock source. The clocks within the network are not synchronized to a single clock source, such as GPS. By default, decoys generate their own clock signals to send and receive traffic.

A system clock allows the decoy to sample (or detect) and transmit data being received and transmitted through its interfaces. Clocking enables the device to detect and transmit the 0s and 1s that make up digital traffic through the interface. Failure to detect the bits within a data flow results in dropped traffic. Short-term fluctuations in the clock signal are known as clock jitter. Long-term variations in the signal are known as clock wander. Asynchronous clocking can either derive the clock signal from the data stream or transmit the clocking signal explicitly.

Data Stream Clocking

Common in T1 links, data stream clocking occurs when separate clock signals are not transmitted within the network. Instead, devices must extract the clock signal from the data stream. As bits are transmitted across the network, each bit has a time slot of 648 nanoseconds. Within a time slot, pulses are transmitted with alternating voltage peaks and drops. The receiving device uses the period of alternating voltages to determine the clock rate for the data stream.

Explicit Clocking Signal Transmission

Clock signals that are shared by hosts across a data link must be transmitted by one or both endpoints on the link. In a serial connection, for example, one host operates as a clock master and the other operates as a clock slave. The clock master internally generates a clock signal that is transmitted across the data link. The clock slave receives the clock signal and uses its period to determine when to sample data and how to transmit data across the link. This type of clock signal controls only the connection on which it is active and is not visible to the rest of the network. An explicit clock signal does not control how other devices or even other interfaces on the same device sample or transmit data.

Network Interface Controller

A network interface controller (NIC, also known as a network interface card, network adapter, LAN adapter or physical network interface) is a computer hardware component that connects a computer to a network. The network controller implements the electronic circuitry required to communicate using a specific physical layer and data link layer standard such as Ethernet or Wi-Fi. This provides a base for a full network protocol stack, allowing communication among computers on the same local area network (LAN) and large-scale network communications through routable protocols, such as Internet Protocol (IP). The NIC allows computers to communicate over a computer network, either by using cables or wirelessly. The NIC is both a physical layer and data link layer device, as it provides physical access to a networking medium and, for IEEE 802 and similar networks, provides a low-level addressing system through the use of MAC addresses that are uniquely assigned to network interfaces.

Example

1. Android or PC user interface
2. Supported Frequency Bands: 16 GHz Bandwidth presence (VHF, UHF, L, S, C, Ku, etc.)
3. Receiver Sensitivity: −86 dB (current configuration)
4. 56 MHz channel bandwidth, 2 channels
5. Supported waveforms: Multiple STD-CDL, BE-CDL, DDL, ANW2 data rates
6. Message Types: Video, Voice, Data, Text
7. All waveform processing resides on single Xilinx Zynq SoC Example 1. RFSoC: Integrates data converters into Zynq UltraScale+ SoC
2. 8×12-bit 4 GSPS A/D Converters and 8×14-bit 6 GSPS DACs
3. Uses 16% of power compared to discrete data converter designs
4. Allows for continuous spectral coverage and identification of LPI signals in small form factor Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

I claim:

1. A battlefield decoy, comprising: (1) an RF housing with a radio-opaque chassis disposed within the RF housing; (2) a System on a Chip (SOC) mounted within the radio-opaque chassis, said SOC having FPGA programmable logic, an application processing unit, a real-time processing unit, a platform management unit, a cybersecurity unit, a memory controller connected to local DDR memory, and a peripheral controller connected to peripheral components; (3) software programming code for simultaneously transmitting a battlefield waveform signature set of at least four (4) battlefield waveforms, said software programming code saved to local DDR memory and executable by the application processing unit, said battlefield waveforms saved to local DDR memory in the SOC; (4) a waveform re-programmer for changing from a first battlefield waveform signature set to a second battlefield waveform signature set contained in the SOC, said waveform reprogrammer comprising programming code saved to local memory and executable by the application processing unit; (5) an RF controller contained in the SOC for controlling RF components in the RF housing, said RF controller comprising programming code saved to local memory and executable by the application processing unit, saki RF components comprising a duplexer, a power amplifier, a band pass filter, a mixer, a local oscillator, an intermediate frequency filter, a modulator, a baseband processor, a demodulator, a second intermediate frequency filter, a second mixer, a second local oscillator, a low noise amplifier, and a second band pass filter; (6) a spectrum manager contained in the SOC for communicating with a spectrum manager in an external network to allocate and coordinate non-interfering battlefield communication channels; (7) a GPS-denied network clocking synchronizer contained in the SOC for maintaining network clock synchronization in a GPS-denied environment; (8) a transmission scheduler contained in the SOC for setting a schedule of transmission start times and transmission durations; (9) an external RF antenna operationally connected to the RF components and extending outside the RF housing; (10) a network interface controller connected to the SOC; (11) a GPS receiver with integrated GPS antenna, connected to the SOC; and (12) a power supply.

2. The battlefield decoy of claim 1, comprising a second System on a Chip that is configured in parallel to the System on a Chip but is positioned away from the System on a Chip and at a different orientation to provide RF hardening redundancy.

3. The battlefield decoy of claim 1, comprising wherein the RF components is implemented as a Software Defined Radio (SDR) on the System on a Chip.

4. The battlefield decoy of claim 1, wherein the RF housing is no larger in dimension than 14"×6"×6".

5. The battlefield decoy of claim 1, wherein said battlefield waveforms are selected from the group consisting of: (3.1) modern software defined radio (SDR) waveform, (3.2) CDL (Common Data Link), (3.3) TCDL (Tactical CDL), (3.4) Bandwidth-Efficient CDL, (3.5) Digital Data Link (DDL), (3.6) Harris Adaptive Networking Wideband (ANW2) Waveform, (3.7) Harris AN/PRC-117G radio 30 MHz-2 GHz waveform (ANW2), (3.8) Harris AN/PRC-152A waveform, (3.9) MAGTF CLT (Marine Air Ground Task Force Company Landing Teams), (3.10) USA BCT (United States Army Basic Combat Training), (3.11) Soldier Radio Waveform (SRW), (3.12) Wideband Networking Waveform (WNW), (3.13) MUOS (Mobile User Objective System) satellite waveform, (3.14) Single Channel Ground and Airborne Radio System (SINCGARS), (3.15) the HAVE QUICK-I/II waveform, (3.16) UHF 300 MHz-3 GHz, (3.17) VHF 30 MHZ-300 MHz, (3.18) broadband Mobile Ad Hoc Networking (MANET) waveform, (3.19) Wide Band Networking Radio Waveform (WBNR), (3.20) European Secure Software Radio (ESSOR), and (3.21) Coalition Wideband Networking Waveform (COALWNW).

6. The battlefield decoy of claim 1, comprising a repeater having programming code saved to memory and executable by the AFU to receive and re-transmit a battlefield waveform signature set as a bent-pipe repeater without additional digital signal processing.

7. The battlefield decoy of claim 1, comprising a repeater having programming code saved to memory and executable by the APU to receive, process, and re- transmit a battlefield waveform signature set, wherein said processing comprises demodulation- remodulation using a MODEM, decompression-recompression using a CODEC, decryption-re- encryption, noise reduction using a filter or software to reduce or eliminate noise, and amplification.

8. The battlefield decoy of claim 1, wherein the RF components are implemented in the System on Chip (SOC).

9. The battlefield decoy of claim 1, wherein the SoC is a Xilinx Zynq-7000 or 7000S device having a single-core processor mated with 28 nm programmable logic, at least one 6.25 Gb/s to 12.5 Gb/s transceiver, and hardened peripherals.

10. The battlefield decoy of claim 1, wherein the SoC is an MPSoC having an Application Processing Unit in communication with an FPGA programmable logic chip, the FPGA programmable logic chip is in communication with a Real Time Processing Unit, a Platform Management Unit and the cyber security unit, the FPGA programmable logic chip is also in communication with peripheral controllers for peripherals, and with memory controllers for multiple DDR modules.

11. The battlefield decoy of claim 1, wherein the SoC is configured as a High Intermediate Frequency (IF) Heterodyne Receiver connected to a Direct RF Sampling receiver having an all programmable RFSoC with a DDC connected to a RFADC, wherein a Local Oscillator (LO) feeds a signal into an RF A-D converter which is in communication with a bandwidth Phase Filter (BPF) and an Anti-Aliasing Filter (AAF), the BPF and AAF feed into a low noise amplifier (LNA) which is connected to an antenna.

* * * * *